May 27, 1952 — G. FOX — 2,597,859

SKIP HOIST MOTOR CONTROL

Filed Sept. 22, 1945 — 4 Sheets-Sheet 1

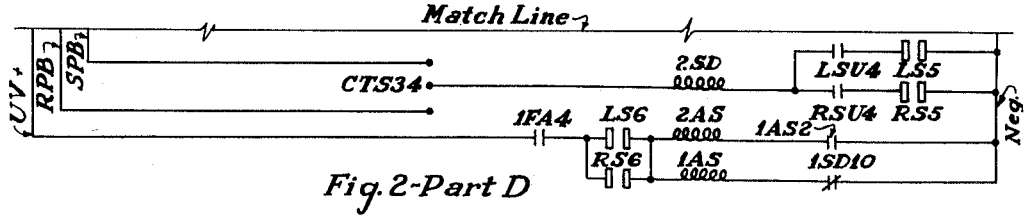

Fig. 2-Part D

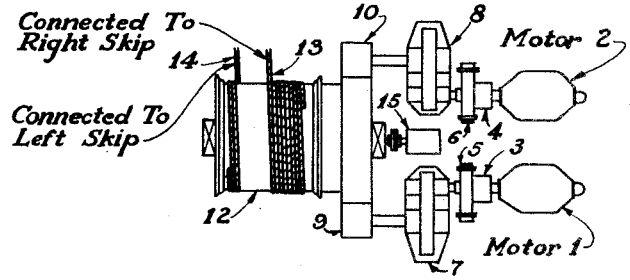

Fig. 1

Control Transfer Switch

| CTS | | Adjust Voltage Stock House | Adjust Voltage Hoist House | Constant Voltage Stock House |
|---|---|---|---|---|
| 1 | a-b | X | — | X |
| | b-c | — | X | — |
| 3 | a-b | — | X | — |
| | b-c | X | — | X |
| 5 | a-b | X | — | X |
| | b-c | — | X | — |
| 6 | a-b | X | — | X |
| | b-c | — | X | — |
| 8 | a-b | — | — | X |
| | b-c | — | — | X |
| 9 | a-b | — | X | — |
| | b-c | — | X | — |
| 10 | a-b | — | — | X |
| | b-c | X | X | — |
| 12 | a-b | — | X | — |
| | b-c | — | X | — |
| 13 | a-b | X | X | — |
| | b-c | — | — | X |
| 15 | a-b | — | — | X |
| | b-c | X | X | — |
| 16 | a-b | — | X | — |
| | b-c | X | — | — |
| 20 | a-b | X | X | — |
| | b-c | — | — | X |
| 21 | a-b | — | — | X |
| | b-c | — | — | X |
| 22 | a-b | X | X | — |
| | b-c | — | — | X |
| 24 | a-b | — | X | — |
| | b-c | X | — | — |
| 25 | a-b | — | — | X |
| | b-c | — | — | X |
| 26 | a-b | X | X | — |
| | b-c | — | — | X |
| 27 | a-b | — | X | — |
| | b-c | X | — | — |
| 29 | a-b | X | X | — |
| | b-c | — | — | X |
| 30 | a-b | — | X | — |
| | b-c | X | — | — |
| 32 | a-b | X | X | — |
| | b-c | — | — | X |
| 33 | a-b | X | X | — |
| | b-c | — | — | X |
| 34 | a-b | X | X | — |
| | b-c | — | — | X |

Fig. 3

Reference For Contacts

Skip Hoist Limit Switch

Fig. 2 - Part B / Fig. 2 - Part B — FINAL STOPS — SLS2 / SRS2
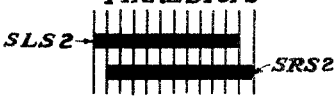

Fig. 2 Part C / Fig. 2 Part C — TRANSITION — SRS3 / SLS3

Fig. 2 - Part C / Fig. 2 - Part C — 1st SLOWDOWN — SLS4 / SRS4

Fig. 2 - Part D / Fig. 2 - Part D — 2nd SLOWDOWN — SRS5 / SLS5

Fig. 2 - Part D / Fig. 2 - Part D — 3rd SLOWDOWN — SRS6 / SLS6

Fig. 2 Part E

INVENTOR.
Gordon Fox
BY
Wilkinson, Huxley, Byron & Hume
ATTORNEYS.

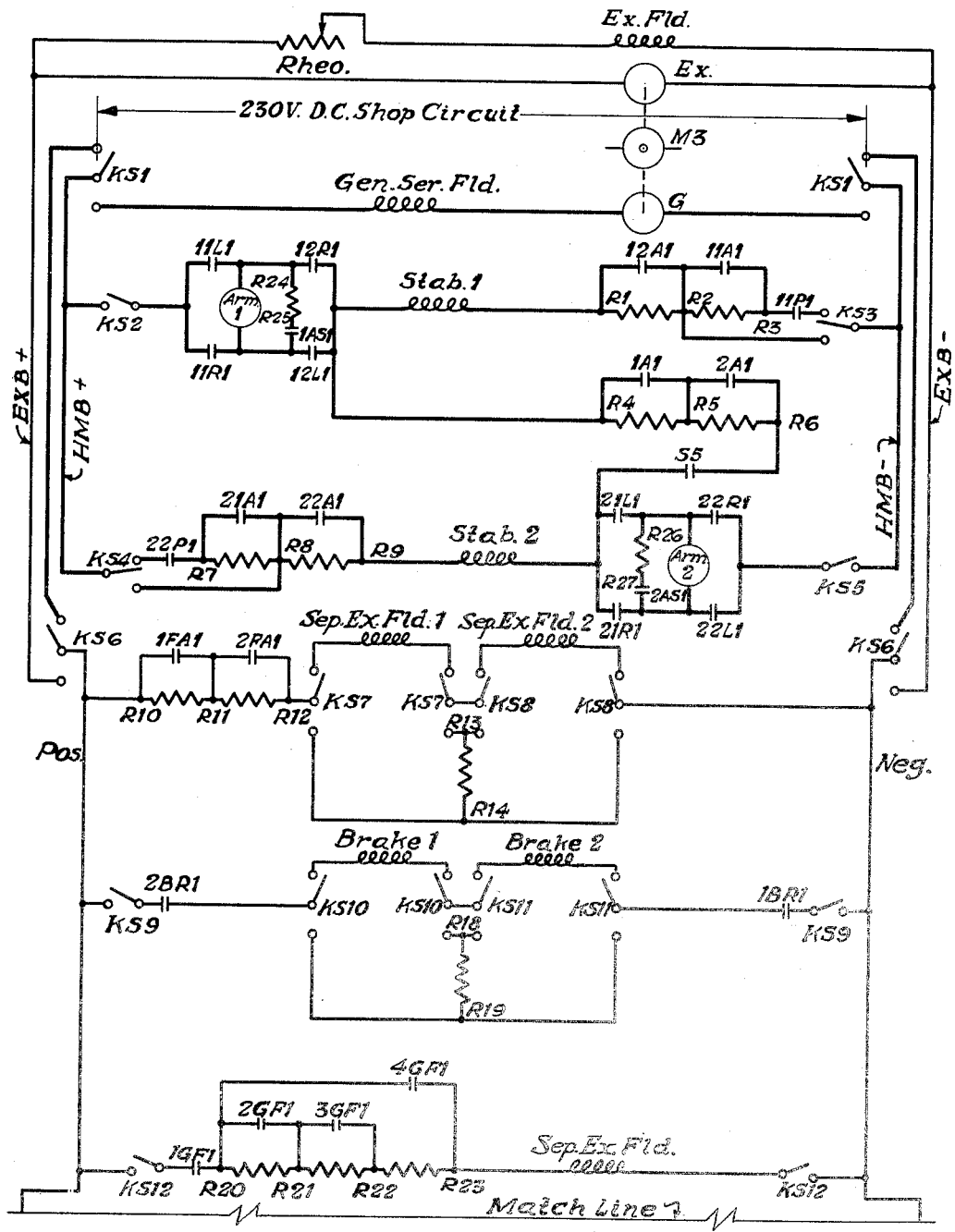
Fig. 2 - Part A
INVENTOR.
Gordon Fox

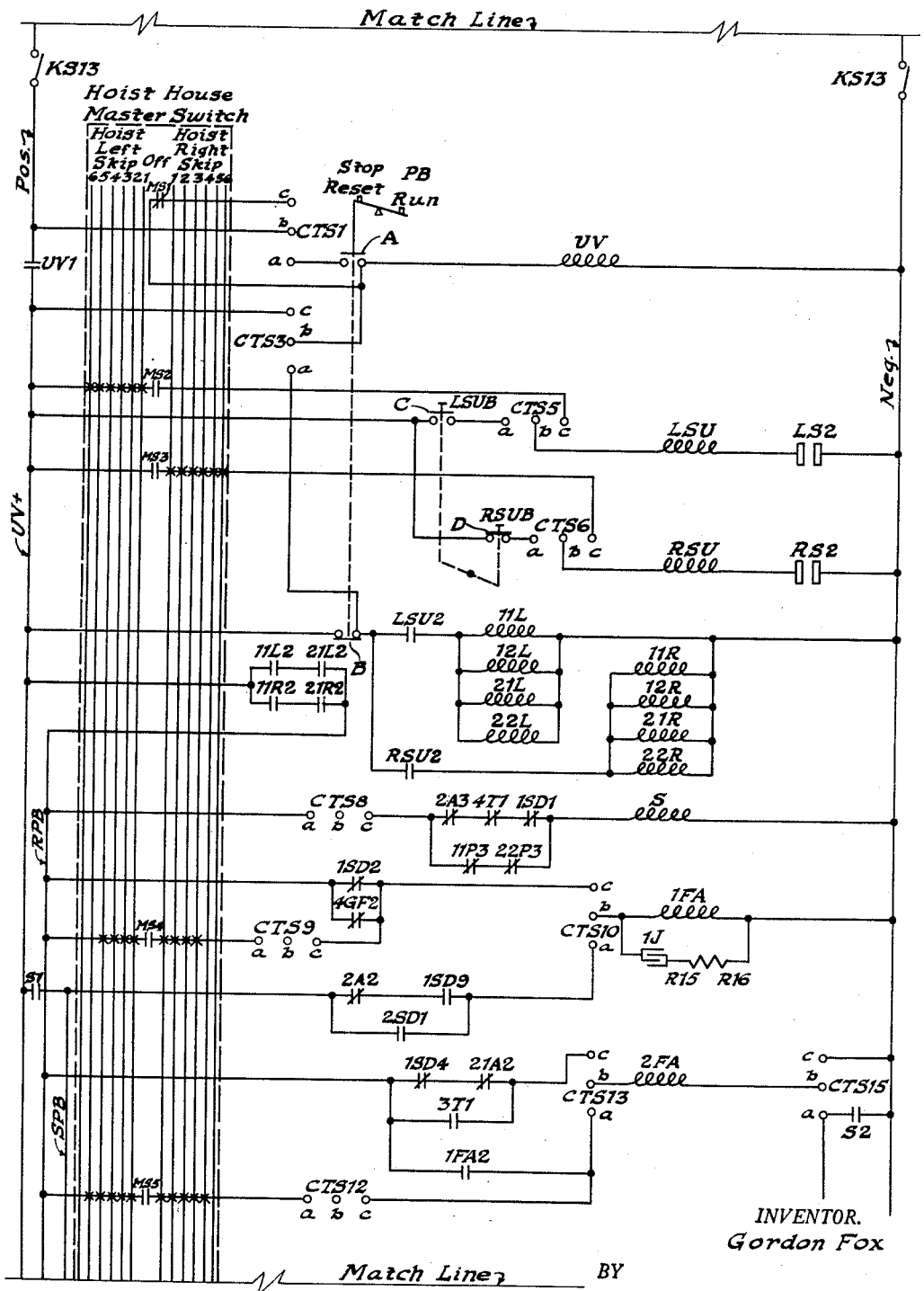
Fig. 2 - Part B
INVENTOR.
Gordon Fox

May 27, 1952      G. FOX      2,597,859
SKIP HOIST MOTOR CONTROL
Filed Sept. 22, 1945      4 Sheets-Sheet 4
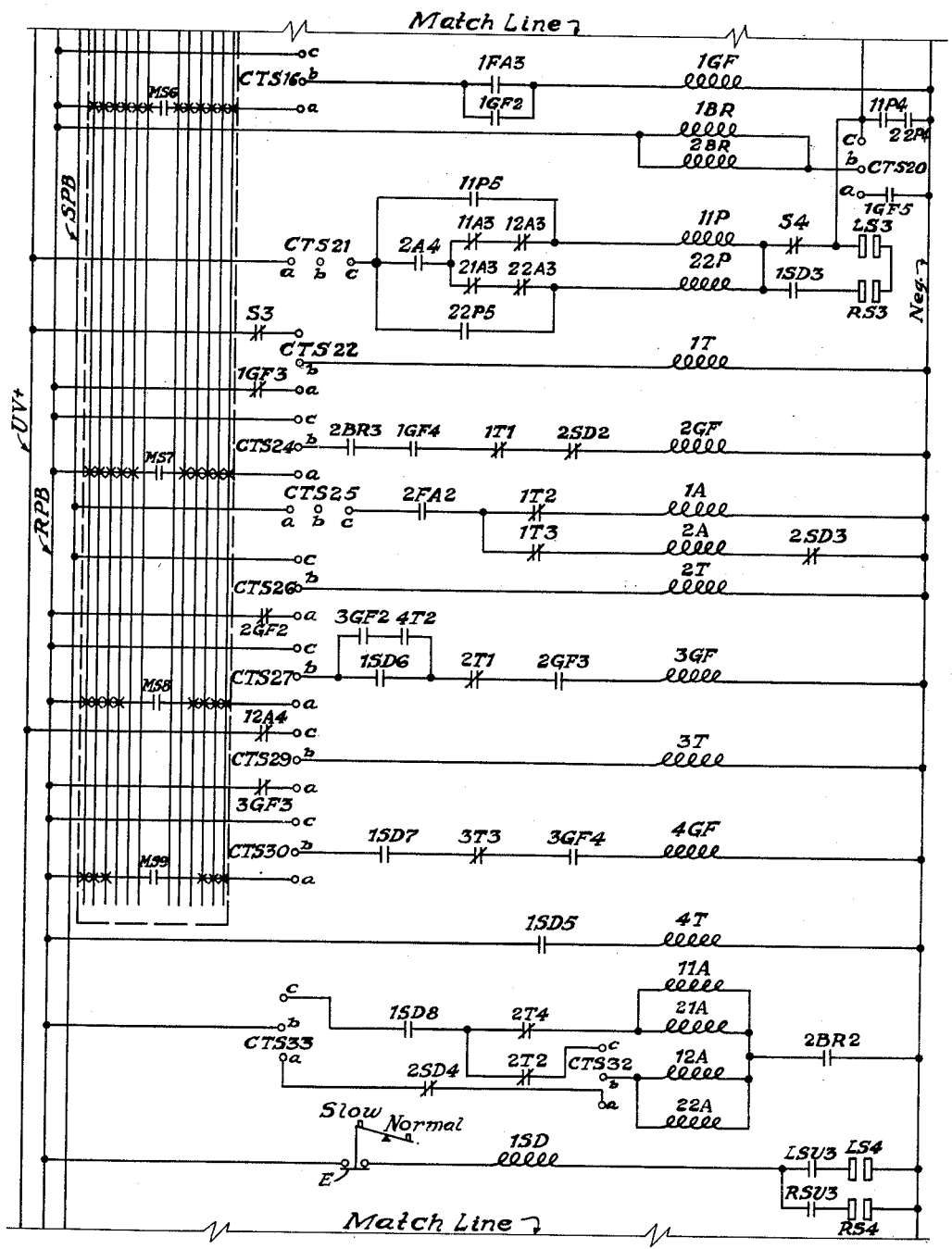
Fig. 2 - Part C
INVENTOR.
Gordon Fox Patented May 27, 1952

2,597,859

UNITED STATES PATENT OFFICE 2,597,859

SKIP HOIST MOTOR CONTROL

Gordon Fox, Chicago, Ill., assignor, by mesne assignments, to Koppers Company, Inc., a corporation of Delaware Application September 22, 1945, Serial No. 618,015

10 Claims. (Cl. 171—97)

The present invention relates to improvements in skip hoist controls.

In United States Patent No. 2,379,958, issued July 10, 1945, in the name of the present applicant, there is described and claimed a skip hoist control adapted to operate from a constant voltage source of electrical supply, said control employing series-parallel arrangements of a pair of motors. United States Patent No. 2,370,855, issued May 19, 1945, in the name of the present applicant, discloses and claims a skip hoist control employing an adjustable-voltage system.

Of these two controls, that disclosed in Patent No. 2,370,855 has certain practical advantages which cause it to be preferred by some of those skilled in the art, but involves the use of certain instrumentalities introduced between the primary source of electrical supply and the hoist drive, which instrumentalities are not involved in the control described and claimed in Patent No. 2,379,958. Said instrumentalities include the motor and generator of a motor-generator set, the exciter for said generator, and the motor starting equipment for said motor.

Inasmuch as certain of said instrumentalities may fail in service, it has been considered advisable, by certain operators of the equipment referred to, to provide duplicates of such instrumentalities. As failures occur only infrequently, these duplicate instrumentalities represent an investment which is idle most of the time.

The skip hoist controls disclosed and claimed in the two patents referred to are similar in certain fundamental respects. An outstanding distinction between them is that the lower portion of the speed range, according to the construction disclosed and claimed in Patent No. 2,379,958, is handled by a series-parallel connection of the motors and the introduction of accelerating resistors, whereas according to Patent No. 2,370,855 the lower portion of the speed range is controlled by adjustment of the voltage of the direct current generator.

An object of the present invention is to provide a skip hoist control having the advantage that operation according to Patent No. 2,370,855 may be had when desired, combined with the advantage that, by the manipulation of simple switching mechanism, operation may be had according to the principles of Patent No. 2,379,958.

A further object is to provide an improved system employing the invention described and claimed in Patent No. 2,370,855 which, in the event of failure of certain of the instrumentalities of that control, may be manipulated through the operation of simple switch mechanism to permit the skip hoist control to be supplied from a constant-voltage direct-current source utilizing the series-parallel connection disclosed and claimed in Patent No. 2,379,958.

A further object is to provide a system employing the advantages of the control disclosed and claimed in Patent No. 2,370,855, which system, in the event of failure of an element of the motor-generator set or of the motor starting mechanism, or of the alternating current supply, may be operated, after the manipulation of certain simple switching mechanism, from a source of direct current at constant voltage such as is usually available at blast furnace plants which employ skip hoist controls.

A further object is to provide a skip hoist control which may be used alternatively on adjustable-voltage and constant-voltage systems.

A further object is to provide a skip hoist control employing adjustable-voltage in combination with armature-shunting of the hoist motors.

A further object is to provide a system of connections whereby either the generator or the exciter of the motor-generator set, or both, may be supplanted by a source of direct current at constant voltage.

A further object is to provide a skip hoist control of wide applicability which is well adapted to meet the needs of commercial service.

Further objects will appear as the description proceeds.

Referring to the drawings—

Figure 1 is a diagrammatic view illustrating the winding drum for operating the two cables of a double skip hoist, said winding drum having associated therewith the limit switch, the driving motors, brakes, and gearing for operating and controlling said winding drum;

Figure 2 is an electrical diagram which for convenience is divided into five parts, indicated as Figure 2, part A; Figure 2, part B; Figure 2, part C; Figure 2, part D; and Figure 2, part E;

Figure 3 is a reference chart indicating the operation of a control transfer switch constituting part of the present invention.

The present invention contemplates means such as referred to as a control transfer switch in Patent No. 2,379,958 for prearranging a large number of control circuits for accomplishing a prearranged sequence of events in the operation of the driving motors, or either of them, and their associated instrumentalities. According to the illustrated embodiment of the present invention, the control transfer switch has three operative positions which, in combination with simple switching mechanism, provide seven alternative controls, as follows:

1. Adjustable-voltage control from the stock house.
   1a. With two motors (normal operation) (Alternative No. 1)
   1b. With one motor only (Alternative No. 2)
   1c. With the other motor only (Alternative No. 3)
2. Adjustable-voltage control from the hoist house.
   2a. With two motors (Alternative No. 4)
   2b. With one motor only (Alternative No. 5)
   2c. With the other motor only (Alternative No. 6)
3. Constant-voltage control from the stock house (Alternative No. 7)

The combinations under alternatives No. 1 and No. 2 will normally be operative with the exciter supplying constant voltage direct current for excitation of field, brake, contactor, relay coils, et cetera. However, the exciter may be supplanted by another source of direct current supply. In alternative No. 3 the supplementary source of direct current supply is the exclusive source for the motors, their fields and brakes, and for the contactors and relays, et cetera.

DESCRIPTION OF INSTRUMENTALITIES

As illustrated in Figure 1, a pair of driving motors 1 and 2 is provided. Said motors 1 and 2 are connected through couplings 3 and 4, respectively, through brakes 5 and 6 to gear reduction units 7 and 8. The low-speed sides of said gear reduction units 7 and 8 are connected, respectively, to pinions 9 and 10, which mesh with the gear 11. Said gear 11 is rigidly secured to the drum 12, which has secured thereto the cables 13 and 14. Said cables 13 and 14 may be connected, respectively, to the right skip and the left skip of a blast furnace charging mechanism. It will be understood that when one or both of the motors 1—2 are energized to cause rotation of the winding drum 12 in one direction, one of the cables 13 will be wound up upon the drum 12, and the other of said cables will be payed off, and, conversely, when the energization of one or both of the motors 1—2 is such as to cause reverse rotation of the winding drum 12, the movements of said cables 13 and 14 will be reversed. Limit switch means connected to be driven in synchronism with the drum 12 are indicated diagrammatically by the numeral 15.

A description of the electrical diagram in Figure 2 may be prefaced by a statement of the significance of the numerals and letters used thereon, as follows:

The letter A refers to the operating coils and contacts responsive thereto of accelerating relays of a magnetic controller.

The letter G refers to the generator.

The letter M refers to the motors.

The letter P refers to the operating coils and contacts responsive thereto of the parallel contactor.

The letter R refers to resistors in the various circuits.

The letter S refers to the operating coils and contacts responsive thereto of the series contactor.

The letter T refers to the operating coils and contacts responsive thereto of various timing relays.

The letters AS refer to the operating coils and contacts responsive thereto of the armature-shunt contactor.

The letters BR refer to the operating coils and contacts responsive thereto of the brake contactors.

The letters Ex refer to the exciter of the motor generator set.

The letters FA refer to the operating coils and contacts responsive thereto of motor-field-adjusting contactors which function to accelerate the hoist motors and decelerate them.

The letters GF refer to the operating coils and contacts responsive thereto of the generator field relays.

The letters KS refer to various knife switches.

The letters LS refer to the contacts of the limit switch elements controlling the upward movement of the left skip.

The letters RS refer to the contacts of the limit switch elements controlling the upward movement of the right skip.

The letters SD refer to the operating coils and contacts responsive thereto of slow-down relays, 1SD referring to first slow-down and 2SD referring to second slow-down.

The letters UV refer to the operating coil and contacts responsive thereto of an under-voltage or low-voltage relay.

The letters MS refer to the hoist house master switch, which in practice will ordinarly be located in the hoist house.

The letters CTS refer to the control transfer switch.

The letters LSU refer to the operating coil and contacts responsive thereto of a relay controlling the movement of the left skip up.

The letters RSU refer to the operating coil and contacts responsive thereto of a relay controlling the movement of the right skip up.

The letters EXB refer to the exciter bus.

The letters HMB refer to the hoist motor bus.

The letters RPB refer to the running positive bus.

The letters SPB refer to the series postive bus.

The letters SLS and SRS refer to segments of the limit switch cooperating with corresponding contacts LS and RS.

The letters POS refer to the positive bus.

The letters NEG refer to the negative bus.

The indication + refers to the positive side of a direct current circuit.

The indication − refers to the negative side of a direct current circuit.

The letters LSUB refer to a push button control for starting the left skip up.

The letters RSUB refer to a push button control for starting the right skip up.

The letters and numerals 11L, 12L refer to the operating coils and contacts responsive thereto of contactors to operate motor 1 in the direction to move left skip up.

The letters and numerals 11R, 12R refer to the operating coils and contacts responsive thereto of contactors to operate motor 1 in the direction to move right skip up.

The letters and numerals 21L, 22L refer to the operating coils and contacts responsive thereto of contactors to operate motor 2 in the direction to move left skip up.

The letters and numerals 21R, 22R refer to the operating coils and contacts responsive thereto of contactors to operate motor 2 in the direction to move right skip up.

In general, contactors and relays are identified by the characters applied to their operating coils and the contacts are differentiated by the addition of suffixes. For example, 3GF represents the operating coil of a corresponding contactor, and the characters 3GF1 or 3GF2 represent the contacts of this contactor.

The numerals 11, 12 preceding other characters refer to instrumentalities associated with motor 1.

The numerals 21, 22 preceding other characters refer to instrumentalities associated with motor 2.

The characters POS and NEG, respectively, represent the positive bus and the negative bus forming the two sides of a direct current constant voltage circuit, which at a blast furnace plant may be commonly 230 volts.

The character G represents the armature of a generator having a series field winding, Gen. Ser. Fld. The character Ex represents the armature of an exciter. Said generator armature G and exciter armature EX are adapted to be driven by the motor M3. Said exciter has the exciting winding indicated by the caption Ex. Fld., controlled by the rheostat Rheo. Said exciter armature EX and the exciter Ex. Fld. are connected across the exciter busses EX. B+ and EX. B—.

The characters HMB+ and HMB— represent positive and negative busses, respectively, adapted to be connected to the hoist motors 1 and 2.

The double-pole double-throw knife switch KS1 provides means for connecting the hoist motor busses HMB+ and HMB— to either of the two sources of supply. When the switch KS1 is closed upwardly, the hoist motor busses HMB+ and HMB— are connected to the busses POS and NEG of the constant voltage direct current source, which in this specification will be referred to as the shop circuit. When the switch KS1 is closed downwardly the hoist motor busses HMB+ and HMB— are connected to the armature G and the generator series field Gen. Ser. Fld. of the generator, which according to the present invention is the source of electrical supply to be utilized except in cases of emergency. In other words, the switch KS1 is closed downwardly when the skip hoist control is to operate under adjustable-voltage.

The purpose of the exciter, which is driven by the motor M3 of the motor generator set, is to supply constant-voltage direct current to the exciter busses EXB+ and EXB—, whence it is distributed to other circuits, which will be referred to more in detail presently.

The generator G under normal operation according to the present invention supplies direct current to the hoist motor busses HMB+ and HMB— for adjustable-voltage operation, and may in practice deliver about 300 volts maximum.

The positive and negative busses designated by the captions POS and NEG, respectively, are shown connected to the blades of a double-pole double-throw knife switch designated by the caption KS6. When the hoist motors 1 and 2 are operating under adjustable-voltage control, the double-pole double-throw switch KS6 is closed downwardly, connecting the busses POS and NEG to the exciter busses EXB+ and EXB—. For constant-voltage operation of the hoist motors 1 and 2, the double-pole double-throw switch KS6 is closed upwardly and receives current from the constant-voltage shop circuit.

The generator field designated by the caption Gen. Sep. Ex. Fld. is connected across the POS and NEG busses in series with a set of resistors (having taps R20, R21, R22, R23) and relay contacts 1GF1, which are biased open and are adapted to close when their corresponding operating coil 1GF is energized. Across the resistor taps R20—R21 are connected the contacts 2GF1, and across the resistor taps R21—R22 are connected contacts 3GF1, and across the resistor taps R20—R23 are connected the contacts 4GF1. All of these contacts, to wit—2GF1, 3GF1, 4GF1, are biased to open position and are adapted to close when their corresponding operating coils 2GF, 3GF, 4GF are energized. This assembly of contacts permits the adjustment of the excitation effect of the generator field Gen. Sep. Ex. Fld. to adjust the generator voltage. A double-pole knife switch KS12 is provided for disconnecting the generator shunt field Gen. Sh. Fld. and its contact assembly from the POS and NEG busses.

Connected across the hoist motor busses HMB+ and HMB— is a circuit including the armature ARM1 of motor 1 with its directional contact assembly 11L1—12L1—11R1—12R1 (which will be described more in detail hereinafter); the stabilizing field for motor 1, designated by the caption STAB1; a resistor having taps R1—R2—R3; and the contacts 11P1. A single-pole double-throw knife switch KS3 is provided to disconnect this circuit from the hoist motor bus HMB—. When the knife switch KS3 is closed downwardly it will shunt out the resistor between the taps R2 and R3. A single-pole knife switch KS2 is provided to disconnect the armature ARM1 of motor 1 and the above described circuit from the hoist motor bus HMB+.

The contacts 11L1 and 12L1, biased to open position, are adapted to be closed when their corresponding operating coils 11L and 12L are energized. When closed, they permit current to flow through ARM1 of motor 1 in the direction which causes said motor to operate the left skip upwardly.

The contacts 11R1 and 12R1, biased to open position, are adapted to be closed when their corresponding operating coils 11R and 12R are energized. When closed, they permit current to flow through ARM1 of motor 1 in the direction which causes said motor to operate the right skip upwardly.

Across the armature ARM1 of motor 1 is connected a circuit containing a resistor with taps R24—R25 and contacts 1AS1. Contacts 1AS1 are biased to open position and are adapted to close when their corresponding operating coil 1AS is energized.

Connected across the resistor taps R1 and R2 are contacts 12A1, and connected across resistor taps R2 and R3 are contacts 11A1. Both of these sets of contacts are biased to open position and are adapted to be closed when their corresponding operating coils 12A and 11A are energized. Between the resistor tap R3 and the top of knife switch KS3 are contacts 11P1, which are biased to open position and are adapted to close when their corresponding operating coil 11P is energized.

Also connected across the hoist motor busses HMB+ and HMB— is a circuit containing the armature ARM2 of motor 2 with its corresponding directional contact assembly 21L1, 22L1, 21R1, 22R1 (to be described more in detail presently); stabilizing field winding for motor 2, designated by the caption STAB2; a resistor having taps R7, R8, R9; and contacts 22P1. A single-pole double-throw switch KS4 is provided to disconnect this circuit from the hoist motor bus HMB+. When the switch KS4 is closed downwardly it will shunt out the resistor between the taps R7—R8. A single-pole knife switch KS5 is provided to disconnect the armature ARM2 of motor 2 and the above described circuit from the hoist motor bus HMB—. The contacts 21L1 and 22L1, biased to open position, are adapted to be closed when their corresponding operating coils 21L and 22L are energized. When closed they permit current to flow through the armature ARM2 of motor 2 in the direction which causes the motor to operate the left skip upwardly.

The contacts 21R1 and 22R1, biased to open position, are adapted to be closed when their corresponding operating coils 21R and 22R are energized. When closed they permit current to flow through the armature ARM2 of motor 2 in the direction which causes said motor to operate the right skip upwardly.

Across the armature ARM2 of motor 2 is connected a circuit containing a resistor R26—R27 and contacts 2AS1. Contacts 2AS1 are biased to open position and are adapted to be closed when their corresponding operating coil 2AS is energized. Connected across the resistor taps R7 and R8 are contacts 21A1. Connected across the resistor taps R8 and R9 are the contacts 22A1. Both of these sets of contacts are biased to open position and are adapted to be closed when their corresponding operating coils 21A and 22A are energized. Between the resistor tap R7 and the top of the knife switch KS4 are the contacts 22P1, biased to open position and adapted to be closed when their corresponding operating coil 22P is energized.

Still referring to Figure 2, part A, a circuit is shown connected across the POS and NEG busses containing a resistor with taps R10, R11, R12; the field winding of motor 1, designated Sep. Ex. Fld. 1 and the field winding of motor 2 designated Sep. Ex. Fld. 2. Connected across the resistor taps R10 and R11 are the contacts 1FA1, and across the resistor taps R11 and R12 are the contacts 2FA1, both biased to open position and adapted to be closed when their corresponding operating coils 1FA and 2FA are energized. A double-pole double-throw knife switch KS7 and double-pole double-throw knife switch KS8 and a resistor R13—R14 are provided to make it possible to disconnect either motor shunt field from circuit. When both knife switches KS7 and KS8 are closed upwardly, the field windings Sep. Ex. Fld. 1 and Sep. Ex. Fld. 2 are connected in series across POS and NEG busses. When the knife switch KS7 is closed downwardly, it disconnects Sep. Ex. Fld. 1 and inserts resistor R13—R14 in its place in the circuit. When the knife switch KS8 is closed downwardly, it connects resistor R13—R14 in circuit in place of Sep. Ex. Fld. 2.

Also appearing in Figure 2, part A, is a circuit connected across POS and NEG busses containing double-pole knife switch KS9, brake coils Brake 1 and Brake 2 for motor 1 and motor 2, respectively. Also in this circuit are the contacts 2BR1 and 1BR1, biased to open position and adapted to be closed when their corresponding operating coils 2BR and 1BR are energized. Two double-pole double-throw knife switches KS10 and KS11 and a resistor R18—R19 are provided to make it possible to disconnect either brake coil Brake 1 or brake coil Brake 2 from circuit. When both knife switches KS10 and KS11 are closed upwardly, both brake coil Brake 1 and brake coil Brake 2 are in series across POS and NEG busses. When knife switch KS10 is closed downwardly it disconnects brake coil Brake 1 and inserts resistor R18—R19 in its place in the circuit. When knife switch KS11 is closed downwardly it connects resistor R18—R19 in circuit in place of the brake coil Brake 2.

Proceeding now to a description of the instrumentalities in Figure 2, part B, the POS and NEG busses are provided with the double-pole single-throw switch KS13. The POS bus is provided with the contacts UV1 connecting the POS bus with the UV+ bus. Contacts UV1 are biased to open position and are adapted to be closed when their corresponding operating coil UV is energized.

A plurality of elements of the control transfer switch, designated by the caption CTS, are shown in Figure 2, part B, Figure 2, part C, and Figure 2, part D, said elements all including the letters CTS in their designations. The control transfer switch CTS is made up of a number of individual switches each having three sets of contacts, a—b—c. The individual switch elements of the control transfer switch CTS are numbered 1, 3, 5, 6, 8, 9, 10, 12, 13, 15, 16, 20, 21, 22, 24, 25, 26, 27, 29, 30, 32, 33, 34, 35 (Fig. 3). All the individual switch elements are adapted to operate together when the operating handle of the control transfer switch is turned to any one of the three positions indicated in Figure 3. The connections made by the various switches of the control transfer switch for each position of its handle are shown on Figure 3.

As indicated above, the various individual switch elements of the control transfer switch CTS are shown in Figure 2, part B, Figure 2, part C, and Figure 2, part D. For example, the reference character CTS1 refers to switch element 1 of the control transfer switch. The letters a, b refer to one pair of contacts of this particular switch element, and the letters b, c refer to the other set of contacts of this same switch element. In the diagram in Figure 3, the designation X signifies that the circuit is closed and the designation — indicates that the circuit is open. For example, referring to the switch element CTS1, for adjustable-voltage control from the stock house the contacts a—b are closed and the contacts b—c are open. For adjustable-voltage control from the hoist house the contacts a—b are open and the contacts b—c are closed. For constant-voltage control of the two motors from the stock house the contacts a—b are closed and the contacts b—c are open.

The skip hoist limit switch 15 is illustrated diagrammatically by a showing of its segments in Figure 2, part E. Contacts of this switch are shown at various places on Figure 2, part B, Figure 2, part C, and Figure 2, part D. This switch will preferably take the form of a cam type switch with a plurality of sets of contacts designated by the captions LS2—RS2, LS3—RS3, LS4—RS4, LS5—RS5, LS6—RS6. This skip hoist limit switch is geared to the winding drum 12 in a manner to cause a complete cycle to occur in one direction during one complete upward trip of the left skip and a complete cycle to occur in the opposite direction during a complete upward trip of the right skip. These cycles and the electrical connections made therein are illustrated diagrammatically in Figure 2, part E.

The bus UV+ is energized only when the contacts UV1 are closed, and then becomes an extension of and has the same polarity as POS bus.

Figure 2, part B, illustrates a walking beam type push button indicated by the character PB. Said walking beam push button has an operating button indicated by the character "Stop and Reset" on one side of its fulcrum, and an operating button marked "Run" on the other side of its fulcrum. Said push button PB is adapted to control two switches, to wit A and B. When the button marked "Stop and Reset" is depressed the switch A is closed and the switch B is opened. When the button marked "Run" is depressed the switch A is opened and the switch B is closed.

Figure 2, part B, shows a connection from POS bus between the knife switch KS13 and the contacts UV1, which connection leads to the contact b of the switch element CTS1. Contact a of the switch element CTS1 is connected to the switch A responsive to the push button PB. The other side of said switch A is connected through the coil UV of the under-voltage relay to NEG bus. Contact c of the switch element CTS1 is connected through the contacts MS1 (biased to closed position) to the right-hand side of the switch A (controlled by push button PB), which is also connected to the contact b of CTS3. Contact c of the switch element CTS3 is connected to the UV+ bus. Contacts a of the switch element CTS3 is connected to the right-hand side of switch B (responsive to the push button PB). Also appearing on Figure 2, part B, is a connection from UV+ bus to the contacts MS2 of the hoist house master switch and from contacts MS2 to the contact c of the switch element CTS5.

Contacts MS2 of the hoist house master switch are open when the hoist house master switch is in the "Off" position and closed for the entire movement of the hoist house master switch in the direction of upward movement of the left skip.

Contact b of switch element CTS5 is connected to one side of the operating coil LSU for the left-skip-up contactor. The other side of the operating coil LSU is connected to one side of the skip hoist limit switch contacts LS2. The other side of the contacts LS2 is connected to NEG bus. Contact a of the switch element CTS5 is connected to one side of the switch C. Said switch C, together with the switch D, forms part of a walking beam switch. When the push button LSUB is depressed, the switch C is closed and the switch D is opened. When the push button RSUB is depressed, the switch D is closed and the switch C is opened. Said push button LSUB is depressed when it is desired to raise the left skip and the push button RSUB is depressed when it is desired to raise the right skip.

A circuit connects the switch D directly with the bus UV+. A further circuit may be traced from the bus UV+ through the master switch contacts MS3 to contact c of the switch element CTS6. Contacts MS3 are open when the hoist house master switch is in "Off" position and closed for a complete travel of the right skip up.

From contact b of the switch element CTS6 a circuit may be traced through the operating coil RSU of the right-skip-up contactor and through the skip hoist limit switch contacts RS2 to the NEG bus. Contact a of the switch element CTS6 is connected to the right-hand contact of the switch D.

Switch B, which is closed when the "Run" button of push button PB is depressed, has one of its terminals connected to the bus UV+. The opposite terminal of said switch B is connected to one side of the contacts LSU2, the other side of which is connected to common terminals of the operating coils 11L, 12L, 21L, 22L, the opposite common terminals of which are connected to NEG bus. Also connected with the right-hand terminal of the switch B is a conductor leading to one side of the contacts RSU2. From the other side of said contacts a conductor leads to common terminals of the operating coils 11R, 12R, 21R, 22R. The opposite common terminal of these operating coils is connected to NEG bus. Said coils 11L, 12L, 21L and 22L are the operating coils for directional contactors, and the coils 11R, 12R, 21R and 22R are the operating coils for directional contactors.

The contactors LSU2 and RSU2 are biased to open position and are adapted to close when their respective operating coils LSU and RSU are energized.

Connected to the bus UV+ are two parallel branches, one including in series the contactors 11L2 and 21L2, the other branch including in series the contacts 11R2 and 21R2. The other terminals of these two branch circuits are connected to the bus RPB. Contacts 11L2, 21L2, 11R2, 21R2 are biased to open position and are adapted to close when their respective operating coils 11L, 21L, 11R, 21R are energized. The bus RPB is energized only when the contacts 11L2 and 21L2 are closed, or when the contacts 11R2 and 21R2 are closed, at which time said bus RPB becomes an extension of and is of the same polarity as the bus UV+.

The switch element CTS8 has its contact a connected to the bus RPB. Contact c of the switch element CTS8 is connected to a circuit including the contacts 2A3, 4T1, 1SD1, which circuit leads through the series contactor coil S to NEG bus. Connected around the circuit including the contacts 2A3, 4T1 and 1SD1 is a branch circuit including in series the contacts 11P3 and 22P3. All of the contacts 2A3, 4T1, 1SD1, 11P3 and 22P3 are biased to closed position and are adapted to be opened when their respective operating coils 2A, 4T, 1SD, 11P and 22P are energized.

Also connected to the bus RPB is a circuit including the contacts 1SD2, across which are bridged the contacts 4GF2. The opposite terminals of said contacts are connected to the contact c of the switch element CTS10. Contacts 1SD2 and 4GF2 are biased to closed position and are adapted to open when their respective operating coils 1SD and 4GF are energized.

The region between the common terminals of the contacts 1SD2 and 4GF2 on the one hand the contact c of the switch element CTS10 is connected to the contact c of the switch element CTS9. Contact a of the switch element CTS9 is connected through the contacts MS4 of the hoist house master switch to the bus RPB. Contacts MS4 of the hoist house master switch are open when the hoist house master switch is in the "Off" position and during steps 5 and 6 of the operation of the hoist house master switch during the travel of either left skip up or right skip up. Contacts MS4 of the hoist house master swich are closed during steps 1, 2, 3 and 4 of the hoist house master switch during the travel of either left skip up or right skip up.

From the contact b of the switch element CTS10 a circuit leads to the NEG bus through the operating coil 1FA of the first field adjusting contactor. Connected in parallel with the operating coil 1FA is a circuit containing a condenser 1J and a resistor R15—R16.

Also connected across the busses UV+ and

NEG is a circuit including the contacts S1, 2A2 and 1SD9, which circuit connects with the contact *a* of the switch element CTS10. Contact *b* of said switch element CTS10 is connected through the operating coil 1FA to NEG bus. Connected across the sets of contacts 2A2 and 1SD9 are the contacts 2SD1. Contacts S1, 1SD9 and 2SD1 are biased to open position and are adapted to close when their respective operating coils S, 1SD and 2SD are energized. Contacts 2A2 are biased to closed position and are adapted to open when their operating coil 2A is energized.

The bus SPB is connected to a region between contacts S1 and contacts 2A2, so that the bus SPB is energized only when the contacts S1 are closed, at which time it becomes an extension of and of the same polarity as the bus UV+.

Another circuit across the bus RPB and NEG bus includes the contacts 1SD4 and 21A2, which circuit leads to contact *c* of the switch element CTS13. Connected in parallel relationship with the two sets of contacts 1SD4 and 21A2 are the contacts 3T1. Connected to the region between the bus RPB and the contacts 1SD4 is a circuit containing the contacts 1FA2, which circuit is connected to the contact *a* of the switch element CTS13. Contacts 1SD4 and 21A2 are biased to closed position and are adapted to open when their corresponding operating coils 1SD and 21A are energized. Contacts 3T1 and 1FA2 are biased to open position and are adapted to close when their corresponding operating coils 3T and 1FA are energized. Connected to contact *b* of the switch element CTS13 is a circuit containing the operating coil of the second field adjusting contactor designated as 2FA. This circuit connects with the contact *b* of the switch element CTS15. The contact *c* of switch element CTS15 is connected to NEG bus. Contact *a* of switch element CTS15 is connected to NEG bus through the contacts S2. Contacts S2 are biased to open position and are adapted to close when their corresponding operating coil S is energized.

Another circuit connects with the bus RPB and contains the contacts MS5 of the hoist house master switch. This circuit connects with contact *a* of the switch element CTS12. Contacts MS5 of the hoist house master switch are open when the hoist house master switch is in the "Off" position. Said contacts are also open when the hoist house master switch is on step 6 of the travel of the left skip up or the right skip up. Contacts MS5 of the hoist house master switch are closed during the steps 1, 2, 3, 4 and 5 of the travel of either left skip up or right skip up.

Contact *c* of switch element CTS12 is connected to contact *a* of the switch element CTS13.

Referring now to Figure 2, part C, a circuit may be traced from the bus RPB to the contact *c* of switch element CTS16. From contact *b* of switch element CTS16 a circuit may be traced to one side of the contacts 1FA3, the other side of which leads through the operating coil 1GF to NEG bus. Connected in parallel relationship with the contacts 1FA3 are the contacts 1GF2. Contacts 1FA3 and 1GF2 are biased to open position and are adapted to be closed when their corresponding operating coils 1FA and 1GF are energized. Contact *a* of switch element CTS16 is connected to the bus RPB through the hoist house master switch MS6. This contact of the hoist house master switch is open when the hoist house master switch is in the "Off" position and closed for the entire travel of either left skip up or right skip up.

A circuit may also be traced from the bus RPB to common terminals of the operating coil 1BR and the operating coil 2BR, these being brake contactor operating coils. Said two coils are connected in parallel relationship with each other, and the other common terminals thereof are connected to contact *b* of the switch element CTS20. Contact *a* of the switch element CTS20 is connected through the contacts 1GF5 to NEG bus. Said contacts 1GF5 are biased to open position and are adapted to close when their corresponding operating coil 1GF is energized.

From contact *c* of the switch element CTS20, a circuit may be traced through the contacts 11P4 and 22P4 to NEG bus. Contacts 11P4 and 22P4 are biased to open position and are adapted to close when their corresponding operating coils 11P and 22P are energized.

Also connected to contact *c* of the switch element CTS20 is the contact *a* of the switch element CTS15 appearing on Figure 4, part B. Said contact *a* of the switch element CTS 15 is connected to NEG bus through the contacts S2. Contacts S2 are biased to open position and are adapted to close when their corresponding operating coil S is energized.

Referring further to Figure 2, part C, the contact *c* of the switch element CTS20 is connected to one side of the contacts LS3 of the skip hoist limit switch.

Referring further to Figure 2, part C, a circuit may be traced from the bus UV+ to contact *a* of the switch element CTS21. Contact *c* of said switch element CTS1 is connected to a divided circuit, the upper portion of which contains the contacts 2A4, 11A3, 12A3 (contacts 11P5 being in parallel relationship with the contacts 2A4, 11A3 and 12A3). The lower portion of this circuit includes the contacts 2A4, 21A3 and 22A3 (the contacts 22P5 being in parallel relationship with contacts 2A4, 21A3 and 22A3). The opposite end of the circuit including the contacts 2A4, 11A3 and 12A3 leads through the operating coil 11P and contacts S4 connected to one side of the hoist limit switch contacts LS3. The corresponding end of the circuit including the contacts 2A4, 21A3 and 22A3 is connected to the operating coil 22P and through the contacts 1SD3 to one side of the skip hoist limit switch contacts RS3. The opposite sides of said contacts LS3 and RS3 are connected together. Contacts 2A4, 11P5, 22P5 and 1SD3 are biased to open position and are adapted to close when their corresponding operating coils 2A, 11P, 22P and 1SD are energized. Contacts 11A3, 12A3, 21A3, 22A3 and S4 are biased to closed position and are adapted to open when their corresponding operating coils 11A, 12A, 21A, 22A and S are energized. The region between the operating coil 11P and the contacts S4 is electrically connected to the region between the operating coil 22P and the contacts 1SD3.

A circuit may also be traced from the bus UV+ through the contacts S3 to the contact *c* of the switch element CTS22. Contacts S3 are biased to closed position and are adapted to be opened when their corresponding coil S is energized. Contact *b* of the switch element CTS22 is connected through the operating coil 1T to NEG bus. Contact *a* of the switch element CTS22 is connected to the bus RPB through the contacts 1GF3. Contacts 1GF3 are biased to closed position and are adapted to open when their corresponding operating coil 1GF is energized.

Proceeding further with the description of Figure 2, part C, the bus RPB is connected with the contact c of the switch element CTS24. Contact b of switch element CTS24 is connected to NEG bus through contacts 2BR3, contacts 1GF4, contacts 1T1, contacts 2SD2 and operating coil 2GF. Contacts 2BR3 and 1GF4 are biased to open position and are adapted to close when their corresponding operating coils 2BR and 1GF are energized. Contacts 1T1 and 2SD2 are biased to closed position and are adapted to open when their corresponding operating coils 1T and 2SD are energized. The contact a of the switch element CTS24 is connected to the bus RPB through contacts MS7 of the hoist house master switch. Contacts MS7 are open when the hoist master switch is in the "Off" position. Said contacts are also open at step 1 of said hoist master switch for the travel of either left skip up or right skip up. Said contacts MS7 of the hoist house master switch are closed at steps 2, 3, 4, 5 and 6 for the travel of either the left skip up or the right skip up.

Circuit may also be traced from the bus SPB to contact a of the switch element CTS25. Contact c of said switch element CTS25 is connected to the contacts 2FA2, the other side of said contacts being connected to a common terminal of two branch circuits leading to NEG bus. One of said branch circuits includes the contacts 1T2 and the operating coil 1A, and the other branch includes the contacts 1T3, operating coil 2A and the contacts 2SD3. Contacts 1T2, 1T3 and 2SD3 are biased to closed position and are adapted to open when their corresponding operating coils 1T and 2SD are energized. Contacts 2FA2 are biased to open position and are adapted to close when their corresponding operating coil 2FA is energized.

A circuit may also be traced from the bus SPB to contact c of the switch element CTS26 of the control transfer switch. Contact b of said switch element CTS26 is connected through the operating coil 2T to NEG bus. Contact a of the switch element CTS26 is connected to the bus RPB through a circuit containing the contacts 2GF2, biased to open position, and adapted to close when their corresponding operating coil 2GF is energized.

A circuit may also be traced from the running positive bus RPB to contact c of switch element CTS27 of the control transfer switch. Contact b of said switch element CTS27 is connected to NEG bus through a circuit containing the contacts 1SD6, 2T1, 2GF3 and the operating coil 3GF. Connected across the contacts 1SD6 is a circuit including in series the contacts 3GF2 and 4T2. Contacts 3GF2, 4T2, 1SD6 and 2GF3 are biased to open position and are adapted to close when their corresponding operating coils 3GF, 4T, 1SD and 2GF are energized. Contacts 2T1 are biased to closed position and are adapted to open when their corresponding operating coil 2T is energized. Contact a of the switch element CTS27 is connected to the running positive bus RPB through the contacts MS8 of the hoist house master switch. Contacts MS8 of the hoist house master switch are open when the hoist house master switch is in "Off" position. Said contacts MS8 are also open at steps 1 and 2 of the travel of either left skip up or right skip up. Said contacts MS8 of the hoist house master switch are closed at steps 3, 4, 5 and 6 of travel of either left skip up or right skip up.

A circuit may also be traced from the bus UV+ through the contact 12A4 to contact c of the switch element CTS29. Contacts 12A4 are biased to closed position and are adapted to open when their corresponding operating coil 12A is energized. Contact b of the switch element CTS29 of the control transfer switch is connected to NEG bus through the operating coil 3T. Contact a of the switch element CTS29 is connected to the bus RPB through the contacts 3GF3, biased to closed position and adapted to open when their corresponding operating coil 3GF is energized.

A circuit may also be traced from the running positive bus RPB to the contact c of the switch element CTS30 of the control transfer switch. Contact b of the switch element CTS30 is connected to NEG bus by a circuit containing, in series, the contacts 1SD7, 3T3, 3GF4 and the operating coil 4GF. Contacts 1SD7 and 3GF4 are biased to open position and are adapted to close when their corresponding operating coils 1SD and 3GF are energized. Contacts 3T3 are biased to closed position and are adapted to open when their corresponding operating coil 3T is energized. Contact a of the switch element CTS30 is connected to the bus RPB through the contacts MS9 of the hoist house master switch. Contacts MS9 of the hoist house master switch are open when said hoist house master switch is in the "Off" position. Said contacts MS9 are also open for steps 1, 2 and 3 of travel of either the left skip up or the right skip up. Said contacts MS9 of the hoist house master switch are closed at steps 4, 5 and 6 of the travel of either left skip up or right skip up.

Connected across the busses RPB and NEG is a circuit containing the contacts 1SD5 and the operating coil 4T. Contacts 1SD5 are biased to open position and are adapted to close when their corresponding operating coil 1SD is energized.

A circuit may also be traced from the running positive bus RPB to the contact b of the switch element CTS33 of the control transfer switch. Contact c of the switch element CTS33 is connected to one side of the contacts 1SD8, the other side of which is connected to one side of the contacts 2T4, the other side of which is conneted to a common terminal of the two operating coils 11A and 21A (disposed in parallel), the other common terminal of which is connected through the contacts 2BR2 to NEG bus. Contacts 1SD8 and 2BR2 are biased to open position and are adapted to close when their corresponding operating coils 1SD and 2BR are energized. Contacts 2T4 are biased to closed position and are adapted to open when their corresponding operating coil 2T is energized. Contact b of the switch element CTS33 is connected directly to the running positive bus RPB. Contact a of switch element CTS33 is connected through the contacts 2SD4 to the contact a of the switch element CTS32 of the control transfer switch. Said contacts 2SD4 are biased to closed position and are adapted to open when their corresponding operating coil 2SD is energized. Contact b of the switch element CTS32 is connected to NEG bus by a circuit including the operating coils 12A and 22A (disposed in parallel) and contacts 2BR2, biased to open position and adapted to close when their corresponding operating coil 2BR are energized. Contact c of the switch element CTS32 is connected to a point between the contacts 1SD8 and 2T4 to a circuit containing the contacts 2T2 biased to closed position and adapted to open when the corresponding operating coil 2T is energized.

Adjacent to the bottom of part C of Figure 2 is a circuit connected across the running positive bus RPB and NEG bus, which circuit includes the switch E, which is a walking beam switch having the buttons marked "Slow" and "Normal." When the "Slow" button is depressed the switch E is open, and when the "Normal" button is depressed the switch E is closed. A circuit may be traced from the running positive bus RPB through the switch E, through the operating coil 1SD of the first slow-down relay to the common point of two branch circuits arranged in parallel with each other. One of said branch circuits includes the contacts LSU3 and the limit switch contacts LS4. The other of said branch circuits includes the contacts RSU3 and the limit switch contacts RS4. Contacts LSU3 and RSU3 are biased to open position and are adapted to close when their corresponding operating coils LSU and RSU are energized.

Referring now to Figure 2, part D, the bus SPB is connected to the contact c of the switch element CTS34 of the control transfer switch. The contact b of CTS34 is connected through the operating coil 2SD (of the second slow-down relay) to a common point for two branch circuits arranged in parallel with each other. One of said branch circuits includes the contacts LSU4 and the skip hoist limit switch contacts LS5. The other of said branch circuits includes the contacts RSU4 and the skip hoist limit switch contacts RS5. Said contacts LS5 and RS5 are connected to NEG bus. Contacts LSU4 and RSU4 are biased to open position and are adapted to close when their corresponding operating coils LSU and RSU are energized. Contact a of switch element CTS34 is connected to running positive bus RPB.

At the bottom of part D of Figure 2 is a circuit across the bus UV+ and NEG bus which leads from bus UV+ through the contacts 1FA4 to the common point between two branch circuits, one of which includes the limit switch contacts LS6 and the other of which includes the limit switch contacts RS6. The opposite common terminals of limit switch contacts LS6 and RS6 are connected to NEG bus through two parallel branch circuits, one of which includes, in series, the operating coil 2AS of the No. 2 armature shunt contactor and contacts 1AS2. The other of said branch circuits includes the operating coil 1AS for the No. 1 armature shunt contactor and the contacts 1SD10. Contacts 1FA4 and 1AS2 are biased to open position and are adapted to close when their corresponding operating coils 1FA and 1AS are energized. Contacts 1SD10 are biased to closed position and are adapted to open when their corresponding operating coil 1SD is energized.

Figure 2, part E, shows diagrammatically the operation of the skip hoist limit switch. The skip hoist limit switch is so geared to the winding drum 12 that the complete travel of the left skip up causes a complete movement of the limit switch from left to right. Complete travel of the right skip up causes a complete movement of the skip hoist limit switch from right to left. This is indicated in Figure 2, part E, by directional arrows at the top of the skip hoist limit switch diagram.

Said limit switch is provided with segments SLS2, SRS2, SLS3, SRS3, SLS4, SRS4, SLS5, SRS5, SLS6 and SRS6, each of which is adapted to bridge or unbridge a corresponding pair of contacts opposite thereto in the various operations of Figure 2. For example, segment SLS2 is adapted to bridge and unbridge the contacts LS2. The segment SRS2 is adapted to bridge and unbridge the contacts RS2. The segments illustrated in Figure 2, part E, represent the periods of travel during which the corresponding skip hoist limit switch contacts are closed. Where no segments appear, the corresponding skip hoist limit switch contacts are open. It will be noted, therefore, that at the position of start for the left skip up the Final Stop limit switch contacts LS2 in Figure 2, part B, are closed and remain closed until just before the end of the travel of left skip up, at which time they open to bring the left skip to a stop at the proper point for dumping its load. The Transition skip hoist limit switch contacts LS3 (Fig. 2, part C), are closed for approximately five-sixths of the travel of left skip up. These Transition contacts LS3 and RS3 will be described more in detail presently.

The First Slow-Down skip hoist limit switch contacts LS4 in Figure 2, part C, are closed at the start of travel of the left skip up, and, as shown in the diagram in Figure 2, part E, open at about seven-twelfths of the total travel of the left skip up. This point may be chosen as desired, and the choice will depend upon the speed of the skip and the length of the skip incline, and upon other conditions individual to each particular installation.

The Second Slow-Down contacts LS5 in Figure 2, part D, are open at the start of travel of the left skip up and remain open for approximately three-fourths of the total travel of the left skip up, at which point they close and remain closed for the remainder of the travel of the left skip up.

The Third Slow-Down contacts LS6 in Figure 2, part D, are open at the start and remain open for approximately five-sixths of the total travel of the left skip up, at which point they close and remain closed for the remainder of travel of the left skip up.

At the position of start for the right skip up, the Final Stop skip hoist limit switch contacts in Figure 2, part B, are closed and remain closed until just before the end of travel of the right skip up, at which time they open to bring the right skip to a stop at the proper point for dumping its load.

Transition skip hoist limit switch contacts RS3 are closed for approximately five-sixths of the total travel of the right skip up. These Transition contacts will be explained more in detail presently.

The First Slow-Down skip hoist limit switch contacts RS4 (Fig. 2, part C) are closed at the start of travel of the right skip up, and, as shown on the diagram Figure 2, part E, open at about seven-twelfths of the total travel of the right skip up. This point may be chosen as desired and will vary depending upon the speed of the skip, the length of the skip incline, and other conditions individual to each particular installation.

The Second Slow-Down contacts RS5 (Fig. 2, part D) are open at the start of travel of right skip up and remain open for approximately three-fourths of the total travel of the right skip up, at which point they close and remain closed for the remainder of travel of the right skip up.

The Third Slow-Down contacts RS6 (Fig. 2, part D) are open at the start and remain open for approximately five-sixths of the travel of the right skip up, at which point they close and remain closed for the balance of travel of the right skip up.

Figure 3 shows the position of the contacts with the various switches embodied in the control transfer switch. The designation X is used to show contacts closed and the designation — is used to show contacts open. For example, Figure 3 shows the switch element CTS1 in a position in which contacts $a$ and $b$ are closed and contacts $b$ and $c$ are open when the control transfer switch is turned to adjustable-voltage control from the stock house or for constant-voltage control from the stock house. When the control transfer switch is turned to the position for adjustable-voltage control from the hoist house, the switch element CTS1 has its contacts $a$ and $b$ open and its contacts $b$ and $c$ closed.

It will be understood that at each of the three possible positions of the control transfer switch all of the switch elements CTS1, CTS3, CTS5, et cetera, would have their corresponding contacts $a$, $b$, $c$ open or closed in accordance with the diagram in Figure 3.

As indicated above, the three operative positions of the control transfer switch, in combination with other simple switching mechanism, provide seven alternative controls, as follows:

1. Adjustable-voltage control from the stock house.
    1a. With two motors (normal operation) (Alternative No. 1)
    1b. With one motor only (Alternative No. 2)
    1c. With the other motor only (Alternative No. 3)
2. Adjustable-voltage control from the hoist house.
    2a. With two motors (Alternative No. 4)
    2b. With one motor only (Alternative No. 5)
    2c. With the other motor only (Alternative No. 6)
3. Constant-voltage control from the stock house, two-motor (Alternative No. 7)

These alternative controls may be discussed as follows:

ADJUSTABLE-VOLTAGE CONTROL FROM THE STOCK HOUSE

1a.—*With two motors (normal operation)*— Alternative No. 1

To operate the control for the two motors 1 and 2 as an adjustable-voltage control from the stock house, the control transfer switch (Fig. 3) is turned to the position "Adjustable-Voltage Stock House."

For this control double-pole knife switch KS1 (Fig. 2, part A) is closed downwardly to connect the hoist motor busses HMB+ and HMB— to the generator armature G and its series field, Gen. Ser. Fld. Knife switch KS2 is closed. Knife switch KS3 is closed downwardly to cut out resistor R2—R3 as well as contacts 11P1 and to connect the armature Arm. 1 and the stabilizing field Stab. 1 of motor 1 to the hoist motor busses HMB+ and HMB—. Knife switch KS4 is closed downwardly to cut out resistor R7—R8 and contacts 22P1. Knife switch KS5 is closed, connecting the armature Arm. 2 and the stabilizing field Stab. 2 of motor 2 to the hoist motor busses HMB+ and HMB—.

Double-pole knife switch KS6 s closed downwardly, connecting POS bus to the exciter bus EXB+ and connecting NEG bus to the exciter bus EXB—.

Knife switches KS7 and KS8 are closed upwardly, connecting the shunt field of motor 1, Sep. Ex. Fld. 1, and the shunt field of motor 2, Sep. Ex. Fld. 2, in series with resistor R10—R11—R12 between the POS bus and the NEG bus. Double-pole knife switch KS9 is closed.

Knife switches KS10 and KS11 are closed upwardly, connecting brake coil Brake 1 and brake coil Brake 2 in series between POS bus and NEG bus.

Double-pole knife switch KS12 is closed, connecting the generator shunt field Gen. Sep. Ex. Fld. and its resistor and contact assembly between POS bus and NEG bus.

Double-pole knife switch KS13 (Fig. 2, part B) is closed, connecting bus UV+ to POS bus and closing the connection in NEG bus.

The motor M3 of the motor generator set is now driving the armature EX of the exciter, and said exciter will deliver constant voltage direct current, which in practice may be approximately 230 volts. Said armature EX will deliver current to the exciter busses EXB+ and EXB—, which in turn deliver current to the motor and generator fields, brakes and control through the various knife switches which have been operated as mentioned above in the description of this control.

At this time the armature G of the generator is being revolved but no voltage is being produced for the reason that the generator shunt field Gen. Sep. Ex. Fld. (Fig. 2, part A) is not excited, since contacts 1GF1 are open.

Depressing the Stop & Reset button of the push button PB (Fig. 2, part B) establishes a circuit from the POS bus through the contacts $b$ and $a$ of switch element CTS1 of the control transfer switch through the switch A to the operating coil UV of the under-voltage relay to NEG bus. This results in the energization of the operating coil UV, causing it to close the contacts UV1 (Fig. 2, part B), causing the energization of the bus UV+ and establishing the holding circuit for the operating coil UV from bus UV+ through the contacts $c$ and $b$ of the switch element CTS3 to the right-hand contact of switch A.

Depressing the "Run" button of the push button PB results in the closure of the switch B and the assembly is ready for operation.

If the left skip is down in the skip pit, the operator will depress the left skip up push button LSUB (Fig. 2, part B). This will establish a circuit from the bus UV+ through switch C, through contacts $a$ and $b$ of switch element CTS5, through the operating coil LSU, through the skip hoist limit switch contacts LS2 (which are closed at this time) to NEG bus. This results in the energization of the operating coil LSU, causing contacts LSU2 to close, establishing a circuit from bus UV+ through switch B, through contacts LSU2, just closed, through the operating coils 11L, 12L, 21L, 22L (which are in parallel relationship with one another) to NEG bus, thus energizing said operating coils 11L, 12L, 21L, 22L, causing the corresponding contacts 11L1, 12L1, 21L1 and 22L1 to close, thereby establishing a circuit through the armature Arm. 1 of motor 1 and the armature Arm. 2 of motor 2. When this circuit is energized the armatures Arm. 1 and Arm. 2 will revolve in the direction of left skip up.

When the coils 11L and 21L were energized they also closed contacts 11L2 and 21L2 (Figs. 2, part B), thus energizing the running positive bus RPB. From the running positive bus RPB a circuit is established through the contacts 4GF2 (which are closed), through contacts c and b of switch element CTS10 of the control transfer switch, through the operating coil IFA to NEG bus, causing contacts IFA1 (Fig. 2, part A) to close and short-circuit the resistor R10—R11, thereby strengthening the fields of motor 1 and motor 2.

The energizing of coil IFA also causes the closure of contacts IFA2, thus establishing a circuit from the running positive bus RPB through the contacts IFA2, through contacts a and b of switch elements CTS13 of the control transfer switch, through the operating coil 2FA, through contacts b and c of switch element CTS15 to the NEG bus, thus energizing the operating coil 2FA, causing the closure of the contacts 2FA1, which short-circuit the resistor R11—R12 (Fig. 2, part A), further strengthening the shunt fields of motors 1 and 2. This action in practice may strengthen the fields of motors 1 and 2 to about saturation.

Energizing of coil IFA causes the closure of contacts IFA3 (Fig. 2, part C), thus establishing a circuit from the running positive bus RPB through contacts b and c of the switch element CTS16 through the contacts IFA3, through the operating coil IGF to NEG bus, thus energizing coil IGF, causing contacts IGF1 (Fig. 2, part A) to close, exciting the generator shunt field Gen. Sh. Fld. in series with resistors R20—R21—R22—R23.

The energizing of coil IGF also caused the closure of contacts IGF2 (Fig. 2, part C), establishing a maintaining circuit around contacts IFA3.

The excitation of the generator shunt field Gen. Sep. Ex. Fld. causes the generator armature G to develop a voltage which energizes the hoist motor busses HMB+ and HMB—, causing current to flow through the armatures Arm. 1 and Arm. 2 of motors 1 and 2 respectively.

The energizing of coil IGF also caused the closure of contacts IGF5 (Fig. 2, part C), establishing a circuit from the running positive bus RPB through the operating coils IBR and 2BR in parallel relationship with each other, through contacts a and b of the switch element CTS20, through contacts IGF5 to NEG bus, thus energizing the operating coils IBR and 2BR, causing contacts IBR1 and 2BR1 (Fig. 2, part C) to close to energize Brake 1 and Brake 2. This releases the brakes on motors 1 and 2, allowing motors 1 and 2 to revolve, causing the left skip to start upward.

The energizing of coil 2BR also caused contacts 2BR2 (Fig. 2, part C) to close, establishing a circuit from the running positive bus RPB through contacts a and b of switch element CTS33, through contacts 2SD4 (which are closed), through contacts a and b of switch element CTS32, through the operating coils 12A and 22A (in parallel relationship with each other), through the contacts 2BR2 to NEG bus, thus energizing coils 12A and 22A and causing contacts 12A1 and 22A1 (Fig. 2, part A) to close, short-circuiting resistor R1—R2 out of the circuit of the armature Arm. 1 of motor 1 and resistor R7—R8 out of the circuit of the armature Arm. 2 of motor 2, resulting in the slight acceleration of motor speed.

At the time that the running positive bus RPB was energized, circuits were established for the operating coils 1T, 2T, 3T, 1SD and 4T, as follows:

From the running positive bus RPB through the contacts 1GF3 (which were closed at that time), through contacts a and b of switch element CTS22 (Fig. 2, part C), through the operating coil 1T to NEG bus, thus energizing the coil 1T.

From the running positive bus RPB through the contacts 2GF2 (Fig. 2, part C) to contacts a and b of switch element CTS26 (Fig. 2, part C), through the operating coil 2T to NEG bus, thus energizing the coil 2T.

From the running positive bus RPB through the contacts 3GF3 (Fig. 2, part C) through contacts a and b of switch element CTS29 (Fig. 2, part C), through the operating coil 3T to NEG bus, thus energizing the coil 3T.

From the running positive bus RPB, through switch E of the Slow-Normal push button (Fig. 2, part C), through the operating coil 1SD, through the contacts LSU3 (which are closed at this time), through the hoist limit switch contacts LS4 (which are closed at this time) to NEG bus, thus energizing coil 1SD.

From the running positive bus RPB through contacts 1SD5 (Fig. 2, part C), through the operating coil 4T to NEG bus, thus energizing coil 4T.

The timing relays 1T, 2T, 3T and 4T are instrumentalities which operate practically instantaneously upon energization of their operating coils, but operate in reverse sense after a predetermined time delay when their operating coils are deenergized.

At the time an operating coil 1GF is energized, the contacts 1GF3 (Fig. 2, part C) are opened, thus deenergizing operating coil 1T. After a time delay, contacts 1T1 (Fig. 2, part C) are closed, establishing a circuit from the running positive bus RPB through contacts b and c of switch element CTS24, through contacts 2BR3 (which are closed), through contacts 1GF4 (which are closed), through contacts 1T1 (just closed), through contacts 2SD2 (which are closed), through operating coil 2GF to NEG bus, thus energizing the coil 2GF, resulting in the closure of contacts 2GF1 (Fig. 2, part A), short-circuiting resistor R20—R21, thereby increasing the generator field excitation and increasing the generator voltage, causing motors 1 and 2 to be further accelerated.

The energizing of coil 2GF also opened the contacts 2GF2 (Fig. 2, part C), which deenergized the operating coil 2T. After a time delay, contacts 2T1 (Fig. 2, part C) were closed, establishing a circuit from the running positive bus RPB through contacts b and c of switch element CTS27, through the contacts 1SD6 (which are closed), through the contacts 2T1 (just closed), through the contacts 2GF3 (which are closed), through the operating coil 3GF to NEG bus, thus energizing the coil 3GF, closing the contacts 3GF1 (Fig. 2, part A), short-circuiting resistor R21—R22, thus increasing the generator shunt field excitation, causing the generator to increase its voltage, further accelerating motors 1 and 2.

The energizing of coil 3GF also opened contacts 3GF3 (Fig. 2, part C), deenergizing the operating coil 3T, which after a time delay closes contacts 3T3, establishing a circuit from the running positive bus RPB through contacts b and c of the switch element CTS30 (Fig. 2, part C), through the contacts 1SD7 (which are closed), through the contacts 3T3 (just closed), through the contacts 3GF4 (which are closed), through the operating coil 4GF to NEG bus, thus energizing coil 4GF, causing contacts 4GF (Fig. 2, part A) to close, short-circuiting resistor R22—

R23 and increasing the generator shunt field excitation to raise the generator voltage to its predetermined maximum, further accelerating motors 1 and 2.

The energizing of coil 4GF also opens contacts 4GF2 (Fig. 2, part B), deenergizing the operating coil 1FA (since contacts 1SD2 are open) and opening contacts 1FA1 (Fig. 2, part A), which introduces resistor R10—R11 into the circuit of the shunt fields of motors 1 and 2 (Sep. Ex. Fld. 1 and Sep. Ex. Fld. 2), lowering the shunt field excitation of said motors and increasing their speed.

The deenergizing of coil 1FA also opens contacts 1FA2 (Fig. 2, part B), which deenergizes operating coil 2FA, which opens contacts 2FA1 (Fig. 2, part A), introducing resistor R11—R12 into the shunt field circuit of motors 1 and 2 (Sep. Ex. Fld. 1 and Sep. Ex. Fld. 2), further weakening the shunt field excitation of said motors and thereby further increasing the speed of said motors.

At this point in the operation motors 1 and 2 are operating at their highest speed, with the shunt fields of both of said motors weakened and the generator impressing full voltage across the armatures of said motors, to wit—Arm. 1 and Arm. 2.

The hoist continues to travel at this speed until the skip hoist limit switch (Fig. 2, part E) reaches the position of First Slow-Down, at which time limit switch contacts LS4 (Fig. 2, part C) are unbridged by the segment SLS4, resulting in the deenergizing of operating coil 1SD. This causes contacts 1SD2 (Fig. 2, part B) to close, energizing the operating coil 1FA and closing contacts 1FA1 (Fig. 2, part A), which short-circuits resistor R10—R11, increasing the shunt field excitation of motor 1 and motor 2, thereby decreasing the speed of said motors.

The energizing of operating coil 1FA also results in the closure of contacts 1FA2 (Fig. 2, part B), which energizes the operating coil 2FA, closing the contacts 2FA1 (Fig. 2, part A), short-circuiting the resistors R11—R12 and increasing the excitation of shunt fields Sh. Fld. 1 and Sh. Fld. 2 of motors 1 and 2 to about saturation, thereby further decreasing the speed of these motors.

The deenergizing of coil 1SD also opens contacts 1SD7 (Fig. 2, part C), thereby deenergizing the operating coil 4GF, causing contacts 4GF1 (Fig. 2, part A) to open and introduce resistor R22—R23 into the generator shunt field circuit, thereby weakening the generator shunt field excitation and lowering the generated voltage, which again decreases the speed of motors 1 and 2.

The deenergizing of coil 1SD also causes contacts 1SD5 (Fig. 2, part C) to open, deenergizing the operating coil 4T. After a time delay, contacts 4T2 (Fig. 2, part C) open, deenergizing the operating coil 3GF, resulting in the opening of contacts 3GF1 (Fig. 2, part A) and introducing resistor R21—R22 into the generator shunt field circuit, further reducing the generator voltage and again decreasing the speed of motors 1 and 2.

The skip hoist now operates at this speed until the skip hoist limit switch (Fig. 2, part E) reaches the position of Second Slow-Down. At this position the limit switch contacts LS5 (Fig. 2, part D) are bridged by the segment SLS5, establishing a circuit from the running positive bus RPB through contacts a and b, of switch element CTS34 of the control transfer switch through the operating coil 2SD, through contacts LSU4 (which are closed), through the skip hoist limit switch contacts LS5 (just closed) to NEG bus, thus energizing the coil 2SD. The energizing of coil 2SD causes the contacts 2SD2 (Fig. 2, part C) to open, deenergizing the operating coil 2GF, which causes contacts 2GF1 (Fig. 2, part A) to open, introducing resistor R20—R21 into the generator shunt field circuit, thereby lowering the generator voltage and decreasing still further the speed of motors 1 and 2.

The energizing of coil 2SD also opens contacts 2SD4 (Fig. 2, part C), deenergizing operating coils 12A and 22A, resulting in the opening of contacts 12A1 and 22A1 (Fig. 2, part A), introducing resistor R1—R2 into the circuit of the armature Arm. 1 of motor 1 and introducing resistor R8—R9 into the circuit of the armature Arm. 2 of motor 2, thereby further decreasing their speed.

The motors continue at this reduced speed until the skip hoist limit switch (Fig. 2, part E) reaches the position of Third Slow-Down, at which point the segment SLS6 bridges the contacts LS6 (Fig. 2, part D). This establishes a circuit from the bus UV+ to the contacts 1FA4 (which are closed), through the skip hoist limit switch contacts LS6 (just closed), through the operating coil 1AS, through contacts 1SD10 (which are closed) to NEG bus, thus energizing coil 1AS. The energizing of coil 1AS causes the closure of contacts 1AS2 (Fig. 2, part D), which in turn energizes the operating coil 2AS. The energizing of coils 1AS and 2AS (Fig. 2, part D) results in the closure of contacts 1AS1 and 2AS1 (Fig. 2, part A). The closure of contacts 1AS1 introduces resistor R24—R25 across the armature Arm. 1 of motor 1, whereby said resistor acts to by-pass a certain amount of current around the armature Arm. 1, thereby decreasing the speed of motor 1. Contacts 2AS1 perform a like operation in connection with resistor R26—R27 across the armature Arm. 2 to decrease the speed of motor 2.

The hoist continues to operate at this speed until the skip hoist limit switch (Fig. 2, part E) reaches the position of Final Stop, at which point segment SLS2 unbridges the limit switch contacts LS2 (Fig. 2, part C), resulting in the deenergization of operating coil LSU, causing contacts LSU2 (Fig. 2, part B) to open, deenergizing the operating coils 11L—12L—21L—22L, which in turn releases contacts 11L1—12L1—21L1—22L1 (Fig. 2, part A), disconnecting the armatures Arm. 1 and Arm. 2 from the hoist motor busses HMB+ and HMB—.

The deenergizing of coils 11L and 21L results in the opening of contacts 11L2—21L2 (Fig. 2, part B), deenergizing the running positive bus RPB, resulting in deenergizing operating coils 1BR and 2BR (Fig. 2, part C), causing contacts 1BR1 and 2BR1 (Fig. 2, part A) to open, thereby deenergizing Brake 1 and Brake 2 (Fig. 2, part A), causing the brakes on motor 1 and motor 2, respectively, to set.

When the bus RPB is deenergized, the operating coils 1FA and 2FA are also deenergized, causing contacts 1FA1 and 2FA1 (Fig. 2, part A) to open, introducing resistor R10—R11—R12 into circuit of the shunt field coils Sh. Fld. 1 and Sh. Fld. 2 of motors 1 and 2, respectively, thereby preventing excessive heating during the idle period.

The condenser 1J and the resistor R15—R16 connected around the operating coil IFA (Fig. 2, part B) cause a slight time delay when the coil IFA is deenergized. This permits the use of resistor R24—R25 at motor 1 and resistor R26—R27 at motor 2 to act as dynamic brakes to the armatures Arm. 1 and Arm. 2, respectively, of motors 1 and 2.

Operating coils 1AS and 2AS (Fig. 2, part D) are deenergized slowly after the bus RPB is deenergized due to the fact that contacts IFA4 (Fig. 2, part B) operate on this time delay. In this manner contacts 1AS1 and 2AS1 (Fig. 2, part A) are held closed just long enough to have resistor R24—R25 act as a dynamic brake for motor 1 and resistor R26—R27 to act as a dynamic brake for motor 2.

During the foregoing explanation the left skip has been hoisted to the dumping position at the top of the skip incline and the right skip has been lowered to the bottom of the incline.

To start the travel of the right skip up, the operator will depress the button RSUB to close the switch D (Fig. 2, part B), thereby energizing the operating coil RSU and closing the contacts RSU2 (Fig. 2, part B), energizing the operating coils 11R—12R—21R—22R. This starts the right skip up. The sequence of operations will be clear from the description of the operations during the travel of the left skip up, it being remembered that the limit switch contacts RS2, RS4, RS5 and RS6 regulate the slow-down and final stop of the upward travel of the right skip.

ADJUSTABLE-VOLTAGE CONTROL FROM THE STOCK HOUSE

1b.—*With one motor only—Alternative No. 2*

To operate with motor 1 only, the knife switches KS4 and KS5 (Fig. 2, part A) are opened. Knife switch KS8 (Fig. 2, part A) is closed downwardly, inserting resistor R13—R14 in place of the shunt field winding Sep. Ex. Fld. 2 of motor 2. All other operations are the same as for two-motor operation.

ADJUSTABLE-VOLTAGE CONTROL FROM THE STOCK HOUSE

1c.—*With the other motor only—Alternative No. 3*

To operate with motor 2 only, knife switches KS2 and KS3 (Fig. 2, part A) are opened. Knife switch KS7 is closed downwardly, inserting the resistor R13—R14 in circuit in place of the shunt field winding Sep. Ex. Fld. 1 of motor 1.

All other operations are the same as for two-motor operation.

ADJUSTABLE-VOLTAGE CONTROL FROM THE HOIST HOUSE

2a.—*With two motors—Alternative No. 4*

To operate the skip hoist from the hoist house master switch, all knife switches in Figure 2, part A, will be located in the same position as for two-motor, adjustable-voltage control from the stock house (alternative No. 1).

The control transfer switch is turned to the position of adjustable-voltage hoist house (see Fig. 3). Knife switch KS13 (Fig. 2, part B) is closed.

When the hoist house master switch is in the "Off" position, contact MS1 thereof (Fig. 2, part B) is closed, thus establishing a circuit from POS bus through contacts b and c of the switch element CTS1 of the control transfer switch (Fig. 2, part B), through the contact MS1 of the hoist house master switch, through the operating coil UV of the under-voltage relay to NEG bus, thus energizing the coil UV, which closes contact UV1 (Fig. 2, part B), energizing the bus UV+.

The energizing of bus UV+ establishes a maintaining circuit from the bus UV+ through the switch B of the push button PB (Fig. 2, part B) through the contacts a and b of the switch element CTS3, through the operating coil UV to NEG bus. It will be noted at this point that as a safety factor the operator should bring the hoist house master switch to the "Off" position in order to reenergize the coil UV in the event that the hoist had been stopped by depressing the Stop & Reset button of the push button PB.

When the Run button of the push button PB is again depressed it closes switch B. Assuming conditions in which the operator desires to inaugurate the travel of the left skip up, he will move the hoist house master switch to position 1 in the direction of left skip up, establishing a circuit from the bus UV+ through the hoist master switch MS2, through contacts b and c of the switch element CTS5 of the control master switch, through the operating coil LSU, through the skip hoist limit switch contacts LS2 (bridged at this time by the segment SLS2) to NEG bus, thus energizing coil LSU.

The energizing of coil LSU results in the closure of contacts LSU2 (Fig. 2, part B), which establishes a circuit from the bus UV+ through switch B of the push button PB (Fig. 2, part B), through the operating coils 11L—12L—21L—22L in parallel relationship with each other to NEG bus, resulting in the closure of their respective contacts 11L1—12L1—21L1—22L1 (Fig. 2, part A), connecting the armatures Arm. 1 and Arm. 2 of motors 1 and 2, respectively, to the hoist motor busses HMB+ and HMB—. This causes said armatures to revolve in the direction to move the left skip up.

The energizing of coils 11L and 21L results in the closure of contacts 11L2 and 21L2 (Fig. 2, part B), thus energizing the bus RPB.

In position 1 in the direction of left skip up of the hoist house master switch, the contacts MS4 (Fig. 2, part B) are closed, establishing a circuit from the bus RPB, through contacts MS4 of the hoist master switch, through contacts a, b and c of the switch element CTS9 (Fig. 2, part B), through the contacts c and b of the switch element CTS10 (Fig. 2, part B), through the operating coil 1FA to NEG bus, thus energizing coil 1FA, causing contacts 1FA1 (Fig. 2, part A) to close, thereby short-circuiting resistor R10—R11 in the circuit of the shunt field windings Sep. Ex. Fld. 1 and Sep. Ex. Fld. 2 of motors 1 and 2, strengthening the shunt fields of said motors.

In position 1 in the direction of left skip up of the hoist master switch, contacts MS5 (Fig. 2, part B) are closed, establishing a circuit from the bus RPB through contacts MS5 of the hoist master switch through contacts a, b and c of the switch elements CTS12, through contacts a and b of the switch element CTS13, through the operating coil 2FA, through the contacts b and c of the switch element CTS15 (Fig. 2, part B) to NEG bus, thus energizing the operating coil 2FA and causing contacts 2FA1 (Fig. 2, part A) to close, short-circuiting resistor R11—R12 and strengthening the shunt fields of motors 1 and 2 to about saturation.

Still referring to position 1 of the hoist house master switch in the direction of left skip up, the contacts MS6 (Fig. 2, part C) are closed, establishing a circuit from the bus RPB, through the contacts MS6 of the hoist master switch, through contacts *a* and *b* of the switch element CTS16, through the contacts IFA3 (which are closed), through the operating coil 1GF to NEG bus, thus energizing operating coil 1GF and closing contacts 1GF1 (Fig. 2, part A), exciting the generator shunt field Gen. Sh. Fld., causing generator armature G to develop voltage which energizes the busses HMB+ and HMB−, causing current to flow through armatures Arm. 1 and Arm. 2, respectively, of motors 1 and 2, causing said armatures to rotate in the direction to move the left skip up when the brakes are released.

The energizing of the operating coil 1GF closes contacts 1GF2 (Fig. 2, part C), establishing a maintaining circuit for the coil 1GF around the contacts IFA3.

The energizing of operating coil 1GF also closes the contacts 1GF5 (Fig. 2, part C), establishing a circuit from the bus RPB through the operating coils 1BR and 2BR in parallel relationship with each other through contacts *a* and *b* of the switch element CTS20 of the control transfer switch (Fig. 2, part C), through contacts 1GF5 to NEG bus, thus energizing coils 1BR and 2BR and causing contacts 1BR1 and 2BR1 (Fig. 2, part A) to close and energize the brake coils Brake 1 and Brake 2, releasing the brakes from motors 1 and 2 and allowing the armatures of said motors to rotate in the direction to move the left skip up.

The energizing of the bus RPB results in the flow of current from the bus RPB through the contacts 1GF3 (Fig. 2, part C), through the contacts *a* and *b* of switch element 22, through operating coil 1T to NEG bus, thus energizing the coil 1T. Furthermore, the energizing of the bus RPB results in the flow of current from said bus RPB through the contacts 2GF2 (Fig. 2, part C), through the contacts *a* and *b* of the switch element CTS26 (Fig. 2, part C), through the operating coil 2T to NEG bus, thus energizing coil 2T. The energizing of bus RPB also results in a flow of current from said bus RPB through the contacts 3GF3 (Fig. 2, part C), through the contacts *a* and *b* of the switch element CTS29, through the operating coil 3T to NEG bus, thus energizing coil 3T.

The energizing of bus RPB also results in a flow of current from said bus RPB through the switch E (Fig. 2, part C), through the operating coil 1SD of the first slow-down relay, through contacts LSU3 and skip hoist limit switch contacts LS4 (Fig. 2, part C) to NEG bus, thus energizing coil 1SD.

The energizing of bus RPB also results in a flow of current from said bus RPB to the contacts 1SD5 (Fig. 2, part C), through the operating coil 4T to NEG bus, thus energizing the coil 4T.

The energizing of bus RPB also results in a flow of current from said bus RPB through contacts *a* and *b* of switch element CTS33 (Fig. 2, part C), through the contacts 2SD4 (Fig. 2, part C), through contacts *a* and *b* of switch element CTS32 (Fig. 2, part C), through operating coils 12A and 22A in parallel relationship with each other, through contacts 2BR2 to NEG bus, thus energizing coils 12A and 22A and causing their respective contacts 12A1 and 22A1 (Fig. 2, part A) to close, short-circuiting resistor R1—R2 in the armature circuit of motor 1 and resistor R8—R9 in the armature circuit of motor 2, thus accelerating the speed of motors 1 and 2.

It will be noted that at position 1 in the direction of left skip up motors 1 and 2 are operating at slow speed due to the fact that resistors R20—R21—R22—R23 are in series with the generator shunt field winding Gen. Sep. Ex. Fld. (Fig. 2, part A), thereby keeping the voltage developed by the generator at a low value, and motors 1 and 2 will continue to operate at this speed until the hoist house master switch is moved, or until the skip hoist limit switch (geared to the winding drum 12) reaches the position of First Slow-Down. As said skip hoist limit switch is moved in response to movement of the winding drum 12 to the positions of Second Slow-Down, Third Slow-Down and Final Stop, the hoist will be slowed down and stopped, as explained above under the paragraph heading "Adjustable-voltage control from the stock house, 1*a*.—With two motors (normal operation)—Alternative No. 1."

Moving hoist house master switch to position 2 in a direction of left skip up results in the closure of hoist house master switch contacts MS7, establishing a circuit from the bus RPB through the hoist master switch contacts MS7 to contacts *a* and *b* of the switch element CTS24 (Fig. 2, part C), through the contacts 2BR3, through the contacts 1GF4, through the contacts 1T1 (after the lapse of a short time interval to permit the time relay to respond to the deenergization of coil 1T as a result of the opening of the contacts 1GF3), through the operating coil 2GF to NEG bus, thus energizing the coil 2GF, closing the contacts 2GF1 (Fig. 2, part A), short-circuiting resistor R20—R21 in the circuit of the generator shunt field winding Gen. Sh. Fld., thereby increasing the voltage developed by the armature G and increasing the speed of motors 1 and 2.

Moving the hoist house master switch to position 3 in the direction of left skip up closes the hoist master switch contacts MS8, establishing a circuit from bus RPB through the hoist house master switch contacts MS8, through contacts *a* and *b* of switch element CTS27 (Fig. 2, part C), through contacts 1SD6, through contacts 2T1 (after the lapse of a short time interval to allow the timing relay to operate in response to opening of contacts 2GF2), through the contacts 2GF3 (Fig. 2, part C), through the operating coil 3GF to NEG bus, thus energizing the coil 3GF, causing the contacts 3GF1 (Fig. 2, part A) to close, which short-circuits resistor R21—R22 out of the generator shunt field circuit, thereby increasing the generator voltage and accelerating the speed of motors 1 and 2.

Moving the hoist house master switch to position 4 in the direction of left skip up closes the hoist house master switch contacts MS9 (Fig. 2, part C), establishing a circuit from the bus RPB through the hoist house master switch contacts MS9, through contacts *a* and *b* of the switch element CTS30, through the contacts 1SD7 to contacts 3T3 (after the lapse of a short time interval to allow the timing relay to operate), through the contacts 3GF4, through the operating coil 4GF to NEG bus, thus energizing coil 4GF, resulting in the closure of contacts 4GF1 (Fig. 2, part A), short-circuiting resistor R22—R23 out of the generator field circuit and increasing the generator voltage to its full voltage value, increasing the speed of motors 1 and 2.

Moving the hoist house master switch to position 5 in the direction of left skip up opens the hoist house master switch contacts MS4 (Fig. 2, part B) and deenergizes the operating coil 1FA, opening contacts 1FA1 (Fig. 2, part A), introducing resistor R10—R11 into the circuit of the shunt field windings Sep. Ex. Fld. 1 and Sep. Ex. Fld. 2 of motors 1 and 2, increasing the shunt field excitation of these motors and increasing their speed.

Moving the hoist house master switch to position 6 in a direction of left skip up opens the hoist house master switch contacts MS5 (Fig. 2, part B), deenergizing the operating coil 2FA, opening contacts 2FA1 (Fig. 2, part A), introducing resistor R11—R12 into the circuit of the shunt field windings Sep. Ex. Fld. 1 and Sep. Ex. Fld. 2 of motors 1 and 2, weakening the shunt field excitation of these motors and again increasing their speed.

This is the last or final position illustrated in the hoist house master switch in the direction of left skip up, and both motors are now running at high speed with the maximum generator voltage across their armatures and the shunt field excitation of said motors weakened.

If the hoist is permitted to operate at this point in the movement of the hoist house master swich, that is—point 6 in the direction of the left skip up, the skip hoist limit switch will act to slow down and stop the skip hoist in the same manner as that described above under the heading "Adjustable-voltage control from the stock house, 1a.—With two motors (normal operation)—Alternative No. 1."

If it be desired to stop the skip hoist by moving the hoist house master switch to the "Off" position, successive steps in operation would occur which would be substantially the same as the accelerating steps of the hoist house master switch above described except in reverse order.

When the operator desires to have the right skip travel up, he will locate the hoist house master switch in position 1 for right skip up, closing contacts MS3 (Fig. 2, part B), establishing a circuit from the bus UV+ through the hoist house master switch contacts MS3 (Fig. 2, part B), through contacts b and c of the switch element CTS6 (Fig. 2, part B), through the operating coil RSU, through the hoist limit switch contacts RS2 to NEG bus, thus energizing the coil RSU and closing contacts RSU2. The closure of contacts RSU2 establishes a circuit from the bus UV+ through the switch B of push button PB (Fig. 2, part B), through the contacts RSU2 through the operating coils 11R—12R—21R—22R in parallel relationship with each other to NEG bus, thus energizing coils 11R—12R—21R—22R and closing contacts 11R1—12R1—21R1—22R1 (Fig. 2, part A), which connect the armatures Arm. 1 and Arm. 2 of motors 1 and 2 to the hoist motor busses HMB+ and HMB— in a manner to cause the armatures of motors 1 and 2 to rotate in the direction to move the right skip up when current flows in this circuit.

The energizing of operating coils 11R and 21R also results in the closure of contacts 11R2 and 21R2 (Fig. 2, part B), energizing the bus RPB.

All other operations for the travel of right skip up are the same as discussed above in connection with the travel of left skip up, it being understood that the moves of the hoist master switch are all in the direction of right skip up.

Adjustable-Voltage Control From the Hoist House

2b.—*With one motor only—Alternative No. 5*

In this alternative control the knife switches are located in the same operating positions as described in connection with Alternative No. 2, Adjustable-voltage control from the stock house, 1b.—With one motor only. The operation otherwise is similar to that described for two-motor operation, Alternative No. 4, Adjustable-voltage control from the hoist house, 2a.—With two motors.

Adjustable-Voltage Control From the Hoist House

2c.—*With the other motor only—Alternative No. 6*

In this alternative control the knife switches are located in the same operating positions as described in connection with Alternative No. 3, Adjustable-voltage control from the stock house, 1c.—With the other motor only. The operation otherwise is similar to that described for two-motor operation, Alternative No. 4, Adjustable-voltage control from the hoist house, 2a.—With two motors.

Constant-Voltage Control From the Stock House

*Two-motor—Alternative No. 7*

This control will be in response to an operator at the stock house. The double-pole, double-throw knife switch KS1 (Fig. 2, part A) is closed upwardly, connecting hoist motor busses HMB+ and HMB— to the constant-voltage source of direct current, which may be at approximately 230 volts.

Knife switch KS2 is closed.
Knife switch KS3 is closed upwardly.
Knife switch KS4 is closed upwardly.
Knife switch KS5 is closed.
Knife switch KS6 is closed upwardly, connecting the circuit of the motor shunt fields Sep. Ex. Fld. 1 and Sep. Ex. Fld. 2 to the constant-voltage direct current source, and also connecting the circuits of the brake coils Brake 1 and Brake 2 to said constant-voltage direct current source.

The knife switches KS7 and KS8 are closed upwardly.

Knife switch KS9 is closed.

The knife switches KS10 and KS11 are closed upwardly.

Knife switch KS12 is opened.

Knife switch KS13 (Fig. 2, part B) is closed.

The control transfer switch (Fig. 3) is moved to position Constant Voltage Stock House, and the Stop & Reset button on push button PB is depressed, which closes switch A, establishing a circuit from POS bus through the contacts b and a of the switch element CTS1 of the control transfer switch (Fig. 2, part B), through the switch A, through the operating coil UV of the undervoltage relay to NEG bus. The energizing of coil UV causes the closure of contacts UV1 (Fig. 2, part B), connecting the bus UV+ to POS bus. Closure of contacts UV1 establishes a maintaining circuit for the coil UV from the bus UV+ through contacts c and b of switch element CTS3 (Fig. 2, part B), through the operating coil UV to NEG bus. This maintains the circuit through the coil UV, and the Run button of the push button PB can now be depressed, opening the switch A and closing the switch B.

The closure of the contacts UV1 establishes a circuit from the bus UV+ through contacts S3 (Fig. 2, part C), through contacts c and b of the switch element CTS22 (Fig. 2, part C), through the operating coil 1T of the corresponding timing relay to NEG bus, thus energizing the coil 1T.

Closure of the contacts UV1 also establishes a circuit from the bus UV+ through the contacts 12A4 through contacts c and b of switch element CTS29 (Fig. 2, part C), through the operating coil 3T of the corresponding time relay to NEG bus, thus energizing the coil 3T.

To start the left skip up the operator depresses the left skip up button LSUB (Fig. 2, part B), thus establishing a circuit from the bus UV+ through the switch C (Fig. 2, part B), through contacts $a$ and $b$ of the switch element CTS5, through the operating coil LSU through the skip hoist limit switch contacts LS2 (Fig. 2, part B) to NEG bus, thus energizing the coil LSU. The energizing of coil LSU closes the contacts LSU2 (Fig. 2, part B) and establishes a circuit from the bus UV+ through the switch B (Fig. 2, part B), through the contacts LSU2, through the operating coils 11L, 12L, 21L and 22L in parallel relationship with each other to NEG bus, thus closing their respective contacts 11L1, 12L1, 21L1, 22L1 (Fig. 2, part A), and establishing a circuit through the armatures Arm. 1 and Arm. 2 of motors 1 and 2 in a manner to cause these armatures to rotate in the direction to move the left skip up when current flows in this circuit.

The energizing of operating coils 11L and 21L results in the closure of contacts 11L2 and 21L2 (Fig. 2, part B), thus energizing the bus RPB. The energizing of bus RPB results in the flow of current from the bus RPB through switch E (Fig. 2, part C), through the operating coil 1SD of the first slow-down relay, through the contacts LSU3 (Fig. 2, part C), through the skip hoist limit switch contacts LS4 (Fig. 2, part C) to NEG bus, thus energizing the coil 1SD.

The energizing of bus RPB also results in the flow of current from the bus RPB through contacts $a$, $b$ and $c$ of the switch element CTS8, through the contacts 11P3, 22P3 (Fig. 2, part B), through the operating coil S to NEG bus, thus energizing the coil S. The energizing of coil S results in the closure of contacts S1 (Fig. 2, part B), establishing a circuit from the bus UV+ through contacts S1, through contacts 2A2 (Fig. 2, part B), through the contacts 1SD9 (Fig. 2, part B), through contacts $a$ and $b$ of the switch element CTS10 of the control transfer switch, through the operating coil 1FA to NEG bus, thus energizing the coil 1FA and closing contacts 1FA1 (Fig. 2, part A), short-circuiting the resistor R10—R11, thereby strengthening the shunt field excitation of motors 1 and 2.

The closing of contacts S1 (Fig. 2, part B) also results in the energization of the bus SPB.

The energizing of coil S also results in the closure of the contacts S5 (Fig. 2, part A), connecting the armatures Arm. 1 and Arm. 2 of motors 1 and 2 in series across the hoist motor busses HMB+ and HMB—.

The energizing of coil S also closes the contacts S2 (Fig. 2, part B), establishing a circuit from the bus RPB through the operating coils 1BR and 2BR (Fig. 2, part C), through contacts $b$ and $c$ of the switch element CTS20, through the contacts S2 (Fig. 2, part B) to NEG bus, thus energizing coils 1BR and 2BR and closing the contacts 1BR1 and 2BR1 (Fig. 2, part A), energizing the brake coils Brake 1 and Brake 2, for motors 1 and 2, respectively, and releasing their corresponding brakes, permitting the hoist to move in the direction of left skip up.

The closure of contacts S2 (Fig. 2, part B) establishes a circuit from the bus RPB through the contacts 3T1 (Fig. 2, part B), through contacts $b$ and $c$ of the switch element CTS13 (Fig. 2, part B), through the operating coil 2FA, through the contacts $a$ and $b$ of the switch element CTS15 (Fig. 2, part B), through contacts S2 to NEG bus, thus energizing the coil 2FA and closing contacts 2FA1 (Fig. 2, part A), short-circuiting resistor R11—R12, increasing the shunt field excitation of motors 1 and 2 to about saturation.

At this time the armatures Arm. 1 and Arm. 2 of motors 1 and 2 are connected in series with each other and also in series with resistor R4—R5—R6 and their shunt fields Sep. Ex. Fld. 1 and Sep. Ex. Fld. 2 are strongly excited. Consequently the motors are running at their lowest speed.

When the bus SPB is energized, current flows from said bus SPB through contacts $b$ and $c$ of the switch element CTS26 of the control transfer switch (Fig. 2, part C), through the operating coil 2T of the corresponding timing relay to NEG bus, thus energizing the coil 2T.

The energization of coil S causes the opening of contacts S3 (Fig. 2, part C), thus deenergizing the operating coil 1T of the corresponding timing relay. After a predetermined delay contacts 1T2 (Fig. 2, part C) close, establishing a circuit from the bus SPB through contacts $a$, $b$ and $c$ of the switch element CTS25, through the contacts 2FA2 (Fig. 2, part C), through the contacts 1T2, through the operating coil 1A to NEG bus, thus energizing the coil 1A and closing the contacts 1A1 (Fig. 2, part A), short-circuiting resistor R4—R5, thereby increasing the amount of current flowing through the armatures Arm. 1 and Arm. 2 of motors 1 and 2, thus increasing their speed.

After a predetermined time delay following the closing of contacts 1T2, contacts 1T3 close, establishing a circuit from the bus SPB through contacts $a$, $b$ and $c$ of switch element CTS25, through contacts 2FA2, through contacts 1T3 (Fig. 2, part C), through operating coil 2A, through the contacts 2SD3 (Fig. 2, part C), to NEG bus, thus energizing the coil 2A and closing contacts 2A1 (Fig. 2, part A), short-circuiting the resistor R5—R6, thereby increasing the amount of current flowing through the armatures Arm. 1 and Arm. 2 of motors 1 and 2 and further increasing their speed.

The energizing of coil 2A also opens contacts 2A2 (Fig. 2, part B), deenergizing the coil 1FA, which after a predetermined delay opens the contacts 1FA1 (Fig. 2, part A), introducing resistor R10—R11 into the shunt field circuit of motors 1 and 2, weakening their shunt field excitation and thereby increasing the speed of these motors.

At this point motor 1 and motor 2 are operating with their armatures in series with each other and their shunt fields partly weakened. Motors 1 and 2 will continue to operate at this speed until the skip hoist limit switch reaches the position for closing the Transition contacts LS3—RS3 (Fig. 2, part C). This occurs at a predetermined point, which has permitted the hoist to accelerate slowly and has allowed the right skip to be lowered from the dumping position to its normal travel position on the skip incline. From this point on the hoist may be operated at increased speed.

When the Transition skip hoist limit switch contacts LS3 and RS3 (Fig. 2, part C) are closed, a circuit is established from the bus UV+ through contacts $a$, $b$ and $c$ of the switch element CTS21 of the control transfer switch (Fig. 2, part C), through the contacts 2A4, through contacts 11A3, 12A3, 21A3, 22A3 (Fig. 2, part C), through operating coils 11P and 22P in parallel relationship, through contacts 1SD3, through skip hoist limit switch contacts LS3—RS3 (Fig. 2, part C), through contacts S2 (Fig. 2, part B) to NEG bus, thus energizing the operating coils 11P and 22P and causing contacts 11P1 and 22P1 (Fig. 2, part A) to close, connecting armature Arm. 1 of motor 1 and armature Arm. 2 of motor 2 to the hoist motor busses HMB+ and HMB— in parallel.

The energizing of coils 11P and 22P also results in the closure of contacts 11P4 and 22P4 (Fig. 2, part C), establishing a connection to NEG bus in parallel with the contacts S2 (Fig. 2, part B).

The energizing of coils 11P and 22P also results in the closure of contacts 11P5 and 22P5 (Fig. 2, part C), establishing a maintaining circuit around contacts 2A4, 11A3, 12A3, 2A4, 21A3 and 22A3, respectively.

The energizing of coils 11P and 22P also results in the opening of contacts 11P3 and 22P3 (Fig. 2, part B), deenergizing the operating coil S, causing the contacts S5 (Fig. 2, part A) to open, breaking the series connection between the armatures Arm. 1 and Arm. 2 of motors 1 and 2.

The deenergizing of coil S also causes contacts S1 (Fig. 2, part B) to open, thus deenergizing bus SPB, whereby the operating coil 2T is deenergized (Fig. 2, part C). After a time delay the contacts 2T2 close (Fig. 2, part C), establishing a circuit from the bus RPB through contacts b and c of the switch element CTS33 of the control transfer switch (Fig. 2, part C), through the contacts 1SD8 (Fig. 2, part C), through contacts 2T2, through contacts b and c of switch element CTS32 (Fig. 2, part C), through the operating coils 12A and 22A in parallel relationship with each other, through the contacts 2BR2 (Fig. 2, part C), to NEG bus, thus energizing operating coils 12A and 22A and causing contacts 12A1 and 22A1 (Fig. 2, part A) to close, short-circuiting resistor R1—R2 and resistor R8—R9 out of the armature circuits of motors 1 and 2, respectively. This causes more current to flow through the armatures of said motors and increases their speed.

After a further delay contacts 2T4 (Fig. 2, part C) close, establishing a circuit from the bus RPB through contacts b and c of switch element CTS33 (Fig. 2, part C), through the contacts 1SD8, through contacts 2T4, through operating coils 11A and 21A in parallel relationship with each other, through the contacts 2BR2 (Fig. 2, part C) to NEG bus, thus energizing the coils 11A and 21A and causing contacts 11A1 and 21A1 (Fig. 2, part A) to close, short-circuiting resistor R2—R3 and resistor R7—R8 out of the armature circuit of motors 1 and 2, respectively, causing more current to flow through their armatures, thereby increasing the speed of said motors.

The energizing of coil 12A causes the contacts 12A4 to open, deenergizing the timing relay operating coil 3T (Fig. 2, part C), and after a time delay opens contacts 3T1 (Fig. 2, part B), thus deenergizing the coil 2FA and causing contacts 2FA1 (Fig. 2, part A) to open, introducing resistor R11—R12 into the shunt field circuit Sep. Ex. Fld. 1 and Sep. Ex. Fld. 2 of motors 1 and 2. This weakens the field excitation of said motors and further increases their speed.

At this point the armature Arm. 1 of motor 1 and the armature Arm. 2 of motor 2 are connected in parallel across the hoist motor busses HMB+ and HMB— with all resistors short-circuited out of the armature circuits and with their shunt fields weakened by the introduction of resistors R10—R11—R12. Consequently motors 1 and 2 are operating at high speed and will continue to operate at this high speed until the skip hoist limit switch (Fig. 2, part E) reaches the position of First Slow-Down, in which position the segment SLS4 unbridges the limit switch contacts LS4 (Fig. 2, part C), thus deenergizing the operating coil 1SD of the first slow-down relay.

The deenergizing of coil 1SD results in the opening of contacts 1SD8 (Fig. 2, part C), deenergizing the operating coils 11A—21A—12A—22A, causing 11A1—21A1—12A1—22A1 (Fig. 2, part A) to open, introducing resistor R1—R2—R3 into the armature circuit of motor 1 and resistor R7—R8—R9 into the armature circuit of motor 2, thereby reducing the speed of motors 1 and 2.

When the coil 21A is deenergized it results in the closure of contacts 21A2 (Fig. 2, part B), energizing the coil 2FA and causing contacts 2FA1 (Fig. 2, part A) to close, short-circuiting resistor R11—R12 out of the field circuit of motors 1 and 2, strengthening their field excitation and thereby further reducing their speed.

The deenergizing of the coil 1SD also results in the opening of contacts 1SD5 (Fig. 2, part C), deenergizing the operating coil 4T of the corresponding timing relay. After a time delay the contacts 4T1 (Fig. 2, part B) close, thus energizing the operating coil S, opening contacts S4, deenergizing the operating coils 11P and 22P, causing contacts 11P1 and 22P1 (Fig. 2, part A) to open, thereby opening the parallel circuits of the armatures of motors 1 and 2.

The energizing of coil S also causes the closure of contacts S5 (Fig. 2, part A), reestablishing the series connection for the armatures Arm. 1 and Arm. 2 of motors 1 and 2.

The energizing of coil S also closes contacts S1 (Fig. 2, part B), thus energizing the bus SPB.

The energizing of coil S also opens contacts S3 (Fig. 2, part C), thus deenergizing the operating coil 1T. After a time delay contacts 1T2 close (Fig. 2, part C), thus energizing the operating coil 1A and closing contacts 1A1, short-circuiting the resistor R4—R5 out of the armature circuit of motors 1 and 2.

After a further delay contacts 1T3 (Fig. 2, part C) close, thus energizing the operating coil 2A, causing the contacts 2A1 (Fig. 2, part A) to close, short-circuiting the resistor R5—R6 out of the armature circuit of motors 1 and 2.

At this point motors 1 and 2 are operating with their armatures in series across the hoist motor busses HMB+ and HMB— with all resistors short-circuited out of this circuit and the shunt fields of motor 1 and motor 2 partly strengthened by reason of the short-circuiting of resistor R11—R12. Consequently motor 1 and motor 2 are operating at reduced speed and will continue to operate at this reduced speed until the skip hoist limit switch (Fig. 2, part E) reaches the position of Second Slow-Down, at which time the segment SLS5 bridges the limit switch contacts LS5, establishing a circuit from the bus SPB through contacts b and c of switch element CTS34 (Fig. 2, part D), through the operating relay 2SD of the second slow-down relay, through contacts LSU4 (Fig. 2, part D), through skip hoist limit switch contacts LS5 to NEG bus, thus energizing the coil 2SD.

The energizing of coil 2SD closes contacts 2SD1 (Fig. 2, part B), thus energizing the operating coil 1FA and closing contacts 1FA1 (Fig. 2, part A), short-circuiting resistor R10—R11 out of the shunt field circuit of motors 1 and 2, thereby increasing the shunt field excitation of said motors to about saturation and further reducing their speed.

The energizing of coil 2SD also results in the opening of contacts 2SD3 (Fig. 2, part C), deenergizing the operating coil 2A, causing contacts 2A1 (Fig. 2, part A) to open, introducing resistor R5—R6 into the armature circuit of motors 1 and 2, thereby further reducing their speed.

Motors 1 and 2 continue to operate at this speed until the skip hoist limit switch (Fig. 2, part E) reaches the position of Third Slow-Down, at which position the segment SLS6 bridges the contacts LS6 (Fig. 2, part D). The bridging of the limit switch contacts LS6 establishes a circuit from bus UV+ through the contacts 1FA4 (Fig. 2, part D), through the skip hoist limit switch contacts LS6, through the operating coil 1AS, through the contacts 1SD10 (Fig. 2, part D) to NEG bus, thus energizing the operating coil 1AS, closing the contacts 1AS1 (Fig. 2, part A), connecting the resistor R24—R25 across the armature Arm. 1 of motor 1, shunting a predetermined amount of current at said armature Arm. 1, thereby reducing its speed.

The energizing of coil 1AS also causes the closure of contacts 1AS2 (Fig. 2, part D), establishing a circuit from the bus UV+ through the contacts 1FA4 through skip hoist limit switch contacts LS6 to the operating coil 2AS, through the contacts 1AS2 to NEG bus, thus energizing coil 2AS and closing contacts 2AS1 (Fig. 2, part A), connecting resistor R26—R27 across the armature Arm. 2 of motor 2, shunting a predetermined amount of current around said armature Arm. 2, thereby reducing its speed similarly to the reducing of the speed of the armature of motor 1.

Motors 1 and 2 continue to operate at this reduced speed until the skip hoist limit switch (Fig. 2, part E) reaches the position of Final Stop, at which position the segment SLS2 unbridges the limit switch contacts LS2 (Fig. 2, part B), deenergizing the operating coil LSU and thereby opening contacts LSU2 (Fig. 2, part B), thus deenergizing the operating coils 11L, 12L, 21L, 22L, opening contacts 11L1, 12L1, 21L1, 22L1 (Fig. 2, part A), disconnecting the armature circuit of motors 1 and 2 from the hoist motor busses HMB+ and HMB—.

The deenergizing of the operating coils 11L and 21L also results in the opening of contacts 11L2 and 21L2 (Fig. 2, part B), thus deenergizing the bus RPB and deenergizing the operating coil S, resulting in the opening of contacts S5 (Fig. 2, part A), opening the series connection between the armatures Arm. 1 and Arm. 2 of motors 1 and 2.

The deenergizing of bus RPB results in the deenergizing of the operating coils 1BR and 2BR (Fig. 2, part C), causing contacts 1BR1 and 2BR1 (Fig. 2, part A) to open, disconnecting the brake coils Brake 1 and Brake 2 of motors 1 and 2, respectively, from POS bus and NEG bus (Fig. 2, part A), causing the brakes to set.

The deenergizing of bus SPB results in the deenergization of the operating coil 1FA. The contacts 1FA4 (Fig. 2, part D) do not open until after a predetermined time delay, thus allowing contacts 1AS1 and 2AS1 (Fig. 2, part A) to stay closed and keep resistors R24—R25 and R26—R27 connected across the armatures Arm. 1 and Arm. 2, respectively, to serve as dynamic brakes on the corresponding motors 1 and 2.

All other instrumentalities are returned to their positions as described at the beginning of the description of this alternative.

The foregoing description under this alternative is related to the travel of the left skip up.

Referring now to the travel of the right skip up, in order to start this travel the operator will depress the right skip up button RSUB, establishing a circuit from bus UV+ through switch D (Fig. 2, part B), through contacts a and b of the switch element CTS6 of the control transfer switch (Fig. 2, part B), through the operating coil RSU, through the skip hoist limit switch contacts RS2 to NEG bus, thus energizing the operating coil RSU and causing contacts RSU2 (Fig. 2, part B) to close.

The closing of contacts RSU2 results in the establishment of a circuit from bus UV+ through switch B (Fig. 2, part B), through the contacts RSU2, through the operating coils 11R—12R, 21R—22R in parallel relationship with each other to NEG bus, thus energizing coils 11R—12R—21R—22R, resulting in the closing of contacts 11R1—12R1—21R1—22R1 (Fig. 2, part A), completing the circuits of armatures Arm. 1 and Arm. 2 of motors 1 and 2 in a manner to cause said armatures to rotate in the direction to move the right skip up when current flows in said circuit.

The energizing of coils 11R and 21R also results in the closure of contacts 11R2 and 21R2 (Fig. 2, part B), energizing the bus RPB. From this point on the operation during the travel of right skip up is the same as for left skip up, described immediately above, except that the skip hoist limit switch contacts RS4—RS5—RS6—RS2 are controlled to cause the First Slow-Down, Second Slow-Down, Third Slow-Down and Final Stop, respectively, and contacts RS3 control the Transition.

Though a preferred embodiment of the present invention has been described in detail, many modifications will occur to those skilled in the art. It is intended to cover all such modifications that fall within the scope of the appended claims.

What is claimed is:

1. Drive means for a skip hoist including a pair of motors, an adjustable voltage source of supply, switch means adapted to selectably connect said motors either to said adjustable voltage source of supply or to a constant voltage source of supply, instrumentalities adapted to control the speed of said motors when connected to said constant voltage source of supply by changes in series-parallel connections of said motors, instrumentalities for controlling said adjustable voltage source of supply, limit switch means adapted to control said instrumentalities through a prescribed cycle of operations, said limit switch means being responsive to the operations of said motors, and control transfer switch means for alternatively establishing circuits from said limit switch means to said motors and to said adjustable source of supply to effect equivalent cycles of operation with respect to adjustable voltage and constant voltage operations.

2. Drive means for a skip hoist having at least one skip comprising: a pair of motors for driving said skip, a generator for supplying current to said motors, exciting means, a source of constant voltage electrical supply, each of said motors and said generator having a field winding adapted to be energized alternatively by said exciting means or said source of constant voltage, instrumentalities including relays, contactors, and timers adapted to control the speed of said motors, a first manually operable switch means for connecting said constant voltage source of supply to said generator and motor field windings, or, alternatively, to connect said exciting means to said generator and motor field windings, a second manually operable switch means for alternatively connecting either said constant voltage source to said motors for alternating series or parallel operation, or said variable voltage generator to said motors in parallel, limit switch means cyclically responsive to the cyclic operation of said skip, control transfer switch means adapted to be set according to the setting of said first and second switches, said limit switch means being adapted, in combination with the predetermined settings of said control transfer switch means, to actuate said instrumentalities in response to the cyclic operation of said skip to establish and open in a predetermined sequence, circuits from said exciting means, or said source of constant voltage according to the setting of said first and second switches, to said generator and motors to control the speed operation of said motors, in one case, when said motors are connected to said adjustable voltage generator, by varying the voltage supplied by said generator and by varying the excitation of said motor field windings, and in another case, when said motors are connected to said source of constant voltage electrical supply by varying the connections of said motors to each other from series to parallel and from parallel to series and by varying the excitation of said motor field windings, whereby to effect a prescribed cycle of speed operation of said motors to the operation of said skip.

3. Drive means for a skip hoist having at least one skip comprising: a pair of motors for driving said skip, exciting means, an adjustable voltage generator, a source of constant voltage, the armatures of said motors being adapted to be supplied from said adjustable voltage generator, or, alternatively from said source of constant voltage, each of said motors and said generator having a field winding adapted to be energized alternatively either from said source of constant voltage or from said exciting means, first control means, including timers, contactors and relays for controlling the speed of said motors in the upper speed range thereof by varying the excitation of the field windings thereof, second control means including timers, contactors and relays for controlling the speed of said motors in the lower range thereof, when said motors are supplied by said generator, by varying the excitation of said generator field winding and hence the voltage supplied by said generator to the armatures of said motors, third control means, including contactors, timers and relays, for controlling the speed of said motors in the lower range thereof, when said motors are supplied by said source of constant voltage, by connecting said motors to said source of constant voltage in alternate series-parallel arrangement, limit switch means cyclically responsive to different phases of operation of said skip, control transfer switch means adapted to be set to connect said limit switch means to said first and third control means for actuation thereof when said motors are supplied by said source of constant voltage or, alternatively, to connect said limit switch means to said first and second control means for actuation thereof when said motors are supplied by said generator, said cyclic responses of said limit switch means being adapted to cooperate with the settings of said control transfer switch means to actuate, in a predetermined sequence, alternatively, either said first and third control means or said first and second control means to control the speed of said motors through a prescribed cycle of speed operation related to the operation of said skip.

4. In a skip hoist assembly having at least one skip, a skip drive assembly for selectively operating said skip through a prescribed cycle of speed operation by means of either a source of constant voltage electrical supply or a source of adjustable voltage electrical supply, said skip drive assembly comprising: a pair of motors for driving said skip, a source of adjustable voltage comprising an adjustable voltage generator, exciting means, a source of constant voltage, each of said motors and said generator having a field winding adapted to be energized by said exciting means or alternatively by said source of constant voltage, switch means for connecting said motors to said generator and said motor and generator field windings to said exciting means, or, alternatively, to connect said motors and said motor and generator field windings to said source of constant voltage, control means for controlling the speed of said motors, limit switch means cyclically responsive to the different phases of operation of said skip, control transfer switch means adapted to be set in predetermined positions according to whether said motors are connected to said generator or said source of constant voltage, said control means being adapted to respond cyclically in a predetermined sequence to the cyclic responses of said limit switch means to said different phases of operation of said skip to establish and open in a predetermined sequence circuits from said exciting means or said source of constant voltage, depending on the setting of said switch means, through said limit switch means, said control means, and said predetermined settings of said control transfer switch means to said motors and said generator to control the speed of said motors, when said motors are being supplied by said generator and said control transfer switch means are set accordingly, by varying the excitation of said generator field windings and hence the voltage supplied by said generator and by varying the excitation of said motor field windings, and, alternatively, when said motors are being supplied by said source of constant voltage and said control transfer switch means are set accordingly, by establishing and opening circuits connecting said motors in alternate series-parallel relationships to said source of constant voltage and by varying the excitation of said motor field windings, to effect a prescribed cycle of speed operation of said motors related to the cycle of operation of said skip.

5. In a skip hoist assembly having at least one skip, a skip drive assembly for selectively operating said skip through a prescribed cycle of operation by means of a source of constant voltage electrical supply, or, alternatively by means of a source of adjustable voltage electrical supply, said skip drive assembly comprising in combination; a pair of motors for driving said skip, each having an armature; a source of constant voltage electrical supply; a source of adjustable voltage supply comprising at least one adjustable voltage generator; switch means for connecting said armatures of said motors to said generator or alternatively to said source of constant voltage electrical supply; first control means for varying the speed of said motors, when connected by said switch means to said generator, according to a prescribed cycle of speed operation corresponding to the cycle of operation of said skip; second control means for varying the speed of said motors, when connected by said switch means to said source of constant voltage, according to said prescribed cycle of operation; limit switch means located for cyclic operation by said skip; control transfer switch means for selectively connecting said limit switch means to either of said control means, according to the setting of said switch means, for actuation thereof by said cyclic operation of said limit switch means by said skip to effect said prescribed cycle of speed operation of said motors related to the cyclic operation of said skip.

6. In a skip hoist assembly having at least one skip adapted to be driven through a prescribed cycle of positional operation, a skip drive assembly comprising; a pair of motors for driving said skip, each having an armature in an armature circuit; a generator for supplying current to said motors; an exciting means; a source of constant voltage, each of said motors and said generator having a field winding adapted to be energized alternatively either by said exciting means or said source of constant voltage; instrumentalities for controlling the speed of said motors, said instrumentalities including resistor and relay means in each of said motor and generator field winding circuits for varying the excitation of said motor and generator field windings respectively and relay means in said motor armature circuits; switch means for alternatively either connecting said motor armatures to said generator and said motor and generator field windings to said exciting means, or, said motor armatures and motor and generator field windings to said source of constant voltage; limit switch means located for cyclic operation by the cyclic positional operation of said skip; control transfer switch means for modifying circuits between said limit switch means and said instrumentalities depending on the setting of said switch means, said cyclic operation of said limit switch means cooperating with the setting of said switch means and said control transfer switch means when said motors are connected to said generator, to control said instrumentalities and hence the speed of said motors, by completing and opening in a definite sequence, circuits to said generator field winding and to said relay means in said motor and generator field winding circuits, thereby varying the amount of resistor means in said motor and generator field winding circuits, and, when said motors are connected with said source of constant voltage, to control said instrumentalities and hence the speed of said motors, by completing and opening, in a definite sequence, circuits to said motor field winding relays and armature circuit relays, thereby varying the amount of resistor means in said motor field winding circuits and connecting said motors in alternate series-parallel relationship to said source of constant voltage, to cause said motors and hence said skip to undergo a prescribed cycle of speed operation corresponding to the cycle of positional operation of said skip.

7. In a skip hoist assembly having at least one skip adapted to be driven through a prescribed cycle of speed operation, a skip hoist drive assembly comprising; a driven member which drives said skip through said cycle of operation, a pair of motors for driving said driven member through a corresponding cycle of operation, a source of adjustable voltage comprising at least one adjustable voltage generator, exciting means, a source of constant voltage, each of said motors and said generator having a field winding adapted to be energized by said exciting means or alternatively by said source of constant voltage, first switch means adapted to selectively connect said motors either to said adjustable voltage generator or to said source of constant voltage supply, second switch means adapted to selectively connect said motor and generator field windings either to said exciting means or to said source of constant voltage; control means comprising relays, resistors, contactors and timers, control transfer switch means adapted to be set in predetermined positions depending on the position of said first and second switch means, manually operative switch means to initiate the operation of said motors and said skip, limit switch means cyclically responsive to the cyclic operation of said skip, said control means being cyclically responsive to said cyclic responses of said limit switch means and the setting of said control transfer switch means to control through a prescribed cycle of operation the speed of said motors when connected through said first switch means to said source of constant voltage supply, by alternately changing the connections of said motors with each other from series to parallel and from parallel to series and by varying the excitation of said motor field windings, and to control through said prescribed cycle of operation the speed of said motors when connected to said adjustable voltage generator, by varying the excitation of said generator field windings and said motor field windings, to effect said cycle of speed operation of said driven member and hence said skip in an equivalent manner with respect to both adjustable voltage and constant voltage operations, said cycle of operation of said skip, motors, control means and limit switches being initiated by manipulation of said manually operative switch.

8. The apparatus of claim 7 wherein said control means comprises: first control means comprising motor field winding resistor means and motor field winding resistor shunt relay means in the circuits of each of said motor field windings; second control means comprising generator field winding relay means in the circuit of said generator field winding, the actuation of which establishes said generator field winding circuits, and generator field winding resistor means and generator field winding resistor shunt relay means in the circuit of said generator field winding, the actuation of said motor and generator field winding resistor shunt relay means being adapted to shunt current around said motor and generator field winding resistor means and hence vary the excitation of said field windings and the speed of said motors; third control means comprising series-parallel relay means in the armature circuits of said motors, the actuation of which connects said armatures alternately in parallel and in series thereby varying the speed of said motors, said control transfer switch means selectively connecting said limit switch means to the relay means of said first and second control means for actuation thereof in a definite sequence when said motors are connected to said generator by said first switch means for operation thereby, or, alternatively to the relay means of said first and third control means for actuation thereof in a definite sequence when said motors are connected to said source of constant voltage for operation thereby, said cyclic operation of said limit switch means in response to the cyclic operation of said skip and in cooperation with said timers and contactors completing and opening circuits in a definite sequence from either said exciting means, or said source of constant voltage, to the relays of either said first and second control means for actuation thereof in a definite sequence when the same are connected by said control transfer switch means to said limit switch means, or, alternatively, to the relay means of said first and third control means for actuation thereof in a definite sequence when the same are connected by said control transfer switch means to said limit switch means, whereby the speed of said motors and hence said skip are controlled through an equivalent prescribed cycle of operation with respect to constant and adjustable voltage operation.

9. A drive assembly adapted to operate through a prescribed cycle of speed operation, said drive assembly comprising a pair of motors each having an armature, an adjustable voltage generator, a source of constant voltage, switch means for connecting said motors to said adjustable generator for adjustable voltage operation thereby, or alternatively, to said source of constant voltage for constant voltage operation thereby, limit switch means adapted to pass through a prescribed cycle of operation in response to the rotation of said motors; first control means the actuation of which controls the speed of said motors through said prescribed cycle of operation by varying the voltage applied by said generator to said armatures, second control means the actuation of which controls the speed of said motors through said prescribed cycle of operation by connecting the armatures of said motors alternately in parallel and in series, control transfer switch means for selectively connecting said limit switch means to said first control means for actuation thereof when said motors are connected by said switch means to said generator for adjustable voltage operation thereby, or, alternatively, to said second control means for actuation thereof, when said motors are connected by said switch means to said source of constant voltage for constant voltage operation thereby, the cyclic operation of said limit switch means in response to the rotation of said motors actuating said first control means when connected thereto by said control transfer switch means or, alternatively, said second control means when connected thereto by said control transfer switch means, to control the speed of said motors through said prescribed cycle of speed operation, equivalently with respect to both constant and adjustable voltage operation.

10. A drive assembly adapted to be operated through a prescribed cycle of speed operation either by a source of adjustable voltage or a source of constant voltage, said drive assembly comprising a pair of motors, each having an armature in an armature circuit, switch means for connecting said motors either to said source of adjustable voltage for said operation thereby or to said source of constant voltage for said operation thereby, limit switch means adapted to pass through a prescribed cycle of operation in response to the rotation of said motors, first control means the actuation of which controls the speed of said motors through said prescribed cycle of operation by completing and opening circuits in a definite sequence to said source of adjustable voltage to vary the voltage produced thereby, second control means the actuation of which controls the speed of said motors through said prescribed cycle of operation by completion and opening circuits in a definite sequence to said motor armature circuits to vary the voltage applied to each of said armatures, control transfer switch means for selectively connecting said limit switch means to said first control means for actuation thereof when said motors are connected by said switch means to said source of adjustable voltage for operation thereby or, alternatively, to said second control means for actuation thereof when said motors are connected by said switch means to said source of constant voltage for operation thereby, said cyclic operation of said limit switch means in response to the rotation of said motors being adapted to actuate said first control means when connected thereto by said control transfer switch means, or, alternatively to actuate said second control means when connected thereto by said control transfer switch means to control the speed of said motors through said prescribed cycle of speed operation equivalently with respect to both constant and adjustable voltage operation.

GORDON FOX.

REFERENCES CITED

The following references are of record in the file of this patent:

UNITED STATES PATENTS

| Number | Name | Date |
|---|---|---|
| 865,819 | Powell | Sept. 10, 1907 |
| 865,822 | Bogen | Sept. 10, 1907 |
| 885,961 | Stover et al. | Apr. 28, 1908 |
| 943,434 | Maier | Dec. 14, 1909 |
| 1,043,036 | Smith | Oct. 29, 1914 |
| 1,147,585 | Wood et al. | July 20, 1915 |
| 1,225,284 | Strong | May 8, 1917 |
| 1,311,208 | Blood | July 29, 1919 |
| 1,342,797 | Conti | June 8, 1920 |
| 1,400,077 | Keith | Dec. 13, 1921 |
| 1,544,780 | Shoemaker et al. | July 7, 1925 |
| 1,764,349 | Robison | June 17, 1930 |
| 1,831,044 | Storer | Nov. 10, 1931 |
| 1,843,588 | Wright | Feb. 2, 1932 |
| 1,891,226 | Fox | Dec. 20, 1932 |
| 1,965,606 | Powell | July 10, 1934 |
| 2,008,404 | Schaelchlin | July 16, 1935 |
| 2,304,895 | Dilworth | Dec. 15, 1942 |
| 2,379,958 | Fox | July 10, 1945 |